(12) United States Patent
Hatta et al.

(10) Patent No.: US 10,113,907 B2
(45) Date of Patent: Oct. 30, 2018

(54) ULTRAVIOLET-SENSING SHEET, ULTRAVIOLET-SENSING SET, AND ULTRAVIOLET-SENSING METHOD

(71) Applicant: FUJIFILM Corporation, Tokyo (JP)

(72) Inventors: Masahiro Hatta, Fujinomiya (JP); Takayuki Matsumoto, Fujinomiya (JP); Hiroki Sasaki, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/412,526

(22) Filed: Jan. 23, 2017

(65) Prior Publication Data

US 2017/0131144 A1    May 11, 2017

Related U.S. Application Data

(63) Continuation of application No. PCT/JP2015/071521, filed on Jul. 29, 2015.

(30) Foreign Application Priority Data

Jul. 31, 2014  (JP) ................................. 2014-156284

(51) Int. Cl.
 *G01J 1/50* (2006.01)
 *G01J 1/04* (2006.01)
 *C09K 9/02* (2006.01)

(52) U.S. Cl.
 CPC ...... *G01J 1/50* (2013.01); *C09K 9/02* (2013.01); *G01J 1/0407* (2013.01)

(58) Field of Classification Search
 CPC ............. G01J 1/50; G01J 1/0407; G09K 9/02
 (Continued)

(56) References Cited

U.S. PATENT DOCUMENTS 3,552,973 A   1/1971  Fishman
4,829,187 A   5/1989  Tomita et al.
(Continued)

FOREIGN PATENT DOCUMENTS

JP    62-112020 A    5/1987
JP    63-305189 A   12/1988
(Continued)

OTHER PUBLICATIONS

International Preliminary Report on Patentability for PCT/JP2015/071521 with English Translation (PCT/IB/373 and PCT/ISA/237), dated Jan. 31, 2017.
(Continued)

*Primary Examiner* — David Porta
*Assistant Examiner* — Blake Riddick
(74) *Attorney, Agent, or Firm* — Birch, Stewart, Kolasch & Birch, LLP

(57) ABSTRACT

Provided are an ultraviolet-sensing sheet, an ultraviolet-sensing set, and an ultraviolet-sensing method, in which color gradation properties which are suitable for detecting an ultraviolet dose are obtained and in which the coloring of an ultraviolet-sensing layer caused by the effect of light other than ultraviolet light is prevented.
An ultraviolet-sensing sheet 1 includes: a filter layer 10 that selectively allows transmission of light having a specific wavelength; and an ultraviolet-sensing layer 20 that includes a capsule including a color-forming dye and a photooxidant. It is preferable that the filter layer 10 has a maximum value of the transmittance in a wavelength range of 300 nm or longer and shorter than 380 nm.

13 Claims, 3 Drawing Sheets

(58) Field of Classification Search
USPC .......................................... 250/473.1, 474.1
See application file for complete search history.

(56) References Cited

U.S. PATENT DOCUMENTS

| | | | | |
|---|---|---|---|---|
| 4,962,009 | A * | 10/1990 | Washizu | G03C 1/002 |
| | | | | 430/138 |
| 5,742,428 | A * | 4/1998 | Singh | G02B 1/02 |
| | | | | 250/372 |
| 2007/0297944 | A1 | 12/2007 | Wendland et al. | |
| 2008/0237763 | A1 * | 10/2008 | Miura | H01L 27/144 |
| | | | | 257/432 |
| 2016/0086989 | A1 * | 3/2016 | Yamamoto | H01L 27/14643 |
| | | | | 257/432 |

FOREIGN PATENT DOCUMENTS

| | | |
|---|---|---|
| JP | 8-43197 A | 2/1996 |
| JP | 8-271334 A | 10/1996 |
| JP | 9-126887 A | 5/1997 |
| JP | 2001-147154 A | 5/2001 |
| JP | 2009-543057 A | 12/2009 |

OTHER PUBLICATIONS

International Search Report for PCT/JP2015/071521 dated Oct. 27, 2015.
Written Opinion of the International Searching Authority for PCT/JP2015/071521 (PCT/ISA/237) dated Oct. 27, 2015.
Japanese Office Action, dated Aug. 29, 2017, for corresponding Japanese Application No. 2016-538405, with an English translation.
Chinese Office Action dated Aug. 24, 2018 with English Abstract for CN201580038267.2.

* cited by examiner

ULTRAVIOLET-SENSING SHEET, ULTRAVIOLET-SENSING SET, AND ULTRAVIOLET-SENSING METHOD

CROSS-REFERENCE TO RELATED APPLICATIONS

This application is a Continuation of PCT International Application No. PCT/JP2015/071521 filed on Jul. 29, 2015, which claims priority under 35 U.S.C. § 119(a) to Japanese Patent Application No. 2014-156284 filed on Jul. 31, 2014. Each of the above application(s) is hereby expressly incorporated by reference, in its entirety, into the present application.

BACKGROUND OF THE INVENTION

1. Field of the Invention

The present invention relates to an ultraviolet-sensing sheet, an ultraviolet-sensing set, and an ultraviolet-sensing method.

2. Description of the Related Art

Ultraviolet dose measurement is used in various fields. For example, the ultraviolet dose of an object irradiated with ultraviolet light is measured in a curing reaction of an ultraviolet curable resin or for ultraviolet sterilization of foods or the like. In order to measure an ultraviolet dose, an ultraviolet dosimeter has been used in the related art.

As the ultraviolet dosimeter, a device using photovoltaic power of a semiconductor is generally known. However, this device is expensive and is inconvenient to carry.

In addition, as an inexpensive and convenient ultraviolet dosimeter, a card-shaped ultraviolet dosimeter using a photochromic material is known. However, this ultraviolet dosimeter is reversibly discolored by ultraviolet light. This ultraviolet dosimeter can be used to determine the ultraviolet intensity during irradiation but cannot be used to determine the cumulative dose of ultraviolet light irradiated.

JP1987-112020A (JP-S62-112020A) discloses an element for measurement of an ultraviolet dose in which a composition including a photo activator, a discoloring agent, and an ultraviolet absorber is laminated on a support, the photo activator forming a free radical by ultraviolet irradiation, and the discoloring agent exhibiting a visible color change by the action of the free radical.

JP1997-126887A (H09-126887A) discloses a material for measuring an ultraviolet irradiation dose which is obtained by laminating a resin layer including a radical generator and a colorant on a transparent substrate, the colorant exhibiting a color change by reacting with a radical.

SUMMARY OF THE INVENTION

However, in the methods disclosed in JP1987-112020A (JP-S62-112020A) and JP1997-126887A (H09-126887A), color gradation properties are poor in an ultraviolet-sensing layer, and it is difficult to determine the quantitativity of an ultraviolet dose. In addition, the ultraviolet-sensing layer is likely to be colored by the effect of light other than ultraviolet light, and the ultraviolet-sensing layer cannot be colored accurately.

Therefore, an object of the present invention is to provide an ultraviolet-sensing sheet, an ultraviolet-sensing set, and an ultraviolet-sensing method, in which color gradation properties which are suitable for detecting an ultraviolet dose are obtained and in which the coloring of an ultraviolet-sensing layer caused by the effect of light other than ultraviolet light is prevented.

As a result of thorough investigation, the present inventors found that, by providing a filter layer, which selectively allows transmission of light having a specific wavelength, and an ultraviolet-sensing layer, which includes a capsule including a color-forming dye and a photooxidant, on a support, an ultraviolet-sensing sheet in which color gradation properties which are suitable for detecting an ultraviolet dose are obtained and in which the coloring of an ultraviolet-sensing layer caused by the effect of light other than ultraviolet light is prevented can be provided, thereby completing the present invention. The present invention provides the following.

<1> An ultraviolet-sensing sheet comprising:
 a filter layer that selectively allows transmission of light having a specific wavelength; and
 an ultraviolet-sensing layer that includes a capsule including a color-forming dye and a photooxidant.
<2> The ultraviolet-sensing sheet according to <1>,
 wherein the filter layer has a region in which a transmittance in a thickness direction in a wavelength range of 300 nm or longer and shorter than 380 nm is 70% or higher.
<3> The ultraviolet-sensing sheet according to <1> or <2>,
 wherein a maximum value of a transmittance of the filter layer in a thickness direction in a wavelength range of 300 nm or longer and shorter than 380 nm is 70% or higher, and
 a maximum value of a transmittance of the filter layer in the thickness direction in a wavelength range of 380 nm to 450 nm is 30% or lower.
<4> The ultraviolet-sensing sheet according to any one of <1> to <3>,
 wherein the filter layer includes at least either a yellow colorant or inorganic particles.
<5> The ultraviolet-sensing sheet according to any one of <1> to <4>,
 wherein the photooxidant includes an organic halogen compound and one or more radical generators selected from the group consisting of a lophine dimer and a benzophenone,
 a mass ratio of the organic halogen compound to the radical generator is 1:0.1 to 1:10, and
 the organic halogen compound is a compound other than a lophine dimer and a benzophenone.
<6> The ultraviolet-sensing sheet according to <5>,
 wherein the number of halogen atoms in one molecule of the organic halogen compound is 3 or more.
<7> The ultraviolet-sensing sheet according to any one of <1> to <6>,
 wherein the color-forming dye is a leuco dye.
<8> The ultraviolet-sensing sheet according to any one of <1> to <7>,
 wherein a mass ratio of the color-forming dye to the photooxidant in the capsule is 1:0.1 to 1:10.
<9> The ultraviolet-sensing sheet according to any one of <1> to <8>>, further comprising:
 a layer having ultraviolet reflectivity.
<10> The ultraviolet-sensing sheet according to any one of <1> to <9>,
 wherein a slope γ of a straight line is 0.06 to 0.7 which is plotted on a graph in which the horizontal axis represents a logarithm of a cumulative illuminance of light having a wavelength of 365 nm irradiated on the ultraviolet-sensing sheet and the vertical axis represents a color optical density of the ultraviolet-sensing layer.

<11> An ultraviolet-sensing set comprising:
the ultraviolet-sensing sheet according to any one of <1> to <10>; and
a sensitivity adjusting filter.
<12> A method of measuring an ultraviolet dose using the ultraviolet-sensing sheet according to any one of <1> to <10>.
<13> The method of measuring an ultraviolet dose according to <12>,
wherein light transmitted through the sensitivity adjusting filter is caused to be incident on the ultraviolet-sensing sheet.

According to the present invention, an ultraviolet-sensing sheet, an ultraviolet-sensing set, and an ultraviolet-sensing method can be provided, in which color gradation properties which are suitable for detecting an ultraviolet dose are obtained and in which the coloring of an ultraviolet-sensing layer caused by the effect of light other than ultraviolet light is prevented.

DESCRIPTION OF THE PREFERRED EMBODIMENTS

Figure 1:
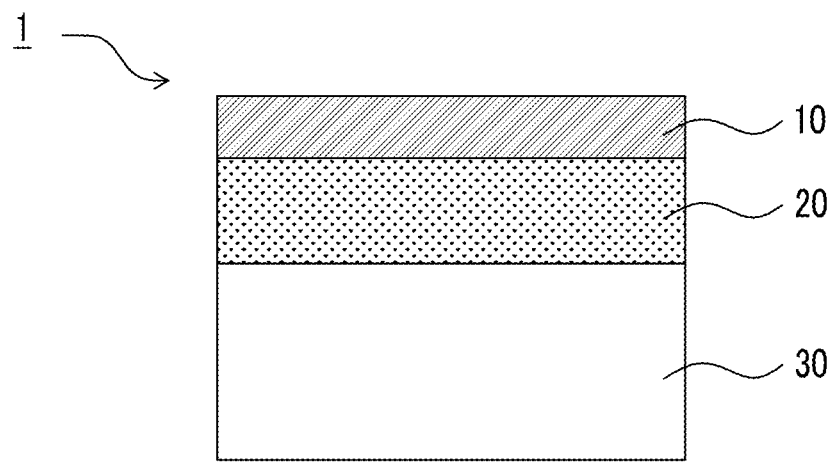
FIG. 1 is a schematic cross-sectional view showing an example of a ultraviolet-sensing sheet according to the present invention.

Hereinafter, the details of the present invention will be described.
In this specification of the present application, numerical ranges represented by "to" include numerical values before and after "to" as lower limit values and upper limit values.
In this specification, ultraviolet light denotes light in a wavelength range of 10 to 400 nm.
In this specification, a total solid content denotes the total mass of components of a composition excluding a solvent.
In this specification, a solid content denotes a solid content at 25° C.
<Ultraviolet-Sensing Sheet>
An ultraviolet-sensing sheet according to the present invention includes: a filter layer that selectively allows transmission of light having a specific wavelength; an ultraviolet-sensing layer that includes a capsule including a color-forming dye and a photooxidant; and a support.

The ultraviolet-sensing sheet according to the present invention includes the above-described filter layer. Therefore, the ultraviolet-sensing layer can be irradiated with light having a specific wavelength. Thus, for example, even in a case where the ultraviolet-sensing layer is irradiated with ultraviolet light in the presence of light other than ultraviolet light, for example, fluorescent light, the coloring of the ultraviolet-sensing layer caused by the effect of light other than ultraviolet light can be prevented.

In the ultraviolet-sensing sheet according to the present invention, the ultraviolet-sensing layer includes a capsule including a color-forming dye and a photooxidant. Therefore, the photooxidant is likely to be present in the vicinity of the color-forming dye. Therefore, the efficiency of a coloring reaction of the color-forming dye using ultraviolet irradiation is excellent, the color gradation properties of the ultraviolet-sensing layer are excellent, and the ultraviolet-sensing layer can be continuously colored depending on a cumulative illuminance of ultraviolet light.

Accordingly, with the ultraviolet-sensing sheet according to the present invention, the ultraviolet dose can be accurately detected.

The details of the ultraviolet-sensing sheet according to the present invention will be described.

<<Configuration of Ultraviolet-Sensing Sheet>>

A configuration of the ultraviolet-sensing sheet according to the present invention will be described with reference to the drawings. It is needless to say that the ultraviolet-sensing sheet according to the present invention is not limited to the configuration shown in the drawings. FIGS. 1 to 5 are schematic cross-sectional views showing still examples of the ultraviolet-sensing sheet according to the present invention.

An ultraviolet-sensing sheet 1 shown in FIG. 1 includes an ultraviolet-sensing layer 20 that is formed on one surface of a support 30. The ultraviolet-sensing sheet shown in FIG. 1 includes a filter layer 10 that is provided on a surface of the ultraviolet-sensing layer 20 opposite to the support 30.

The ultraviolet-sensing sheet according to the present invention may further include a layer having ultraviolet reflectivity such as a reflecting layer. According to this configuration, ultraviolet light irradiated on the ultraviolet-sensing sheet can be reflected by the layer having ultraviolet reflectivity. Therefore, the scattering of ultraviolet light in the ultraviolet-sensing sheet can be prevented, and the detection accuracy of an ultraviolet dose can be further improved. In a case where a support having ultraviolet reflectivity such as a white resin film described below is used as the support 30, the support 30 also has a function as the layer having ultraviolet reflectivity. Therefore, the same effect can be obtained without providing the reflecting layer. However, by providing the reflecting layer, the effect can be further improved.

In the layer having ultraviolet reflectivity, a reflectance to light having a wavelength of 300 to 380 nm is preferably 10% or higher and more preferably 50% or higher. In this specification, a reflectance denotes a value which is obtained by diffuse reflection measurement using an ultraviolet-visible spectrophotometer (UV-2700; manufactured by Shimadzu Corporation).

The ultraviolet-sensing sheet according to the present invention may further include a glossy layer. By providing the glossy layer, the distinguishability between front and back surfaces can be improved.

Examples of an ultraviolet-sensing sheet including the support and the reflecting layer include ultraviolet-sensing sheets having configurations shown in FIGS. 2 to 5. Examples of an ultraviolet-sensing sheet including the support and the glossy layer include ultraviolet-sensing sheets having configurations shown in FIGS. 3 and 5.

A laminate including at least the ultraviolet-sensing layer 20 and the filter layer 10 is peeled off from the support 30, and the laminate including at least the ultraviolet-sensing layer 20 and the filter layer 10 can be used as the ultraviolet-sensing sheet.

Figure 2:
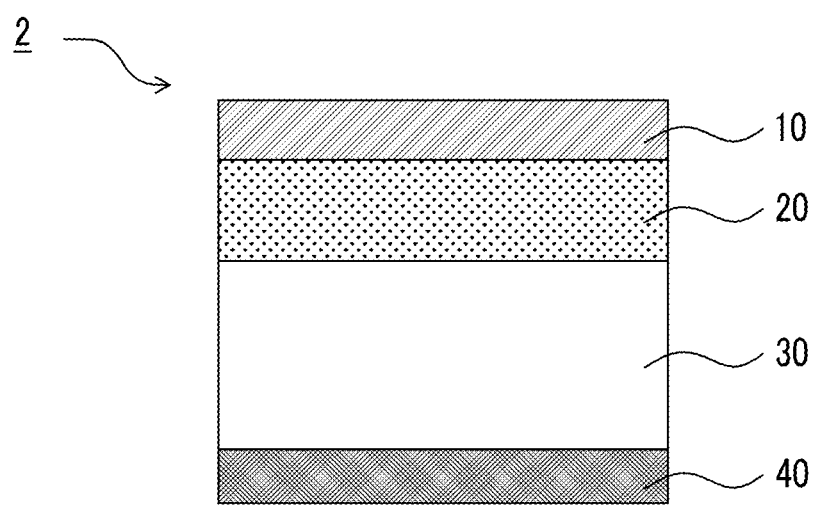
FIG. 2 is a schematic cross-sectional view showing another example of the ultraviolet-sensing sheet according to the present invention.

An ultraviolet-sensing sheet 2 shown in FIG. 2 includes: the ultraviolet-sensing layer 20 that is provided on one surface of the support 30; and the filter layer 10 that is provided on a surface of the ultraviolet-sensing layer 20 opposite to the support 30. In addition, the ultraviolet-sensing sheet 2 further includes the reflecting layer 40 that is provided on a surface of the support 30 opposite to the ultraviolet-sensing layer 20. The reflecting layer 40 may be formed directly on the surface of the support 30 or with a adhesion layer or the like interposed therebetween.

Figure 3:
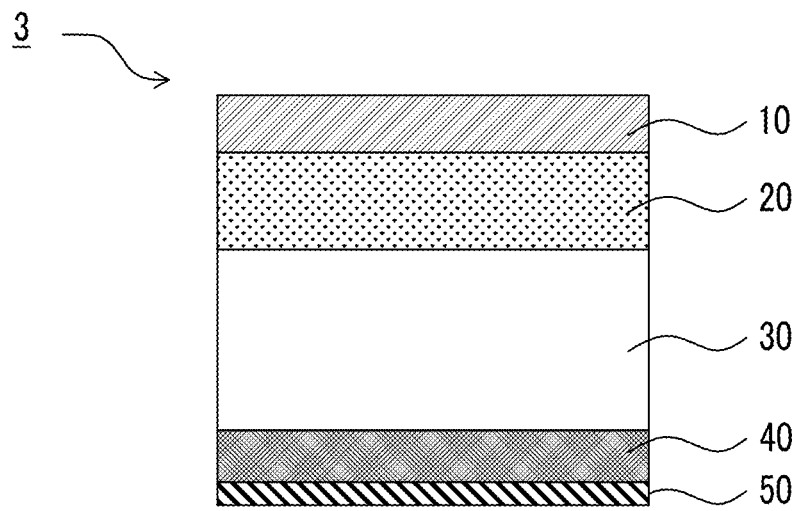
FIG. 3 is a schematic cross-sectional view showing still another example of the ultraviolet-sensing sheet according to the present invention.

An ultraviolet-sensing sheet 3 shown in FIG. 3 includes: the ultraviolet-sensing layer 20 that is provided on one surface of the support 30; and the filter layer 10 that is provided on a surface of the ultraviolet-sensing layer 20 opposite to the support 30. In addition, the ultraviolet-sensing sheet 3 further includes: the reflecting layer 40 that is provided on a surface of the support 30 opposite to the ultraviolet-sensing layer 20; and a glossy layer 50 that is provided on a surface of the reflecting layer 40 opposite to the support 30. The reflecting layer 40 may be formed directly on the surface of the support 30 or with a adhesion layer or the like interposed therebetween.

Figure 4:
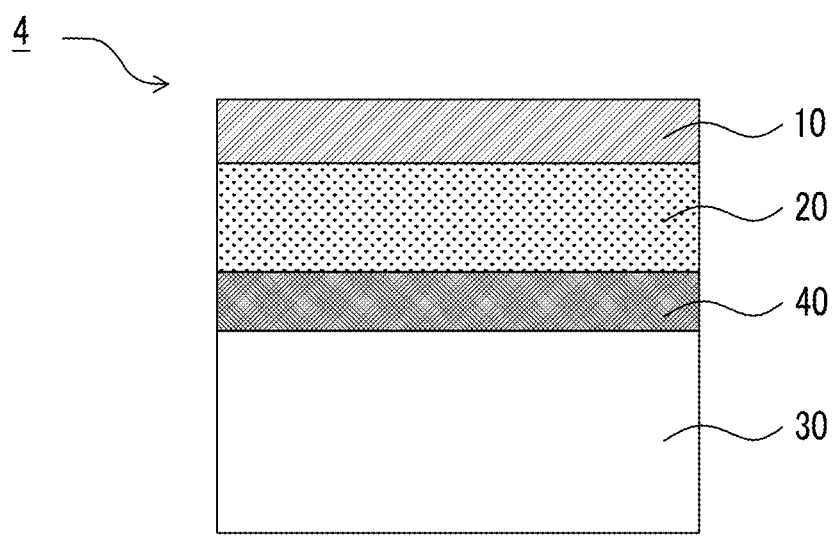
FIG. 4 is a schematic cross-sectional view showing still another example of the ultraviolet-sensing sheet according to the present invention.

An ultraviolet-sensing sheet 4 shown in FIG. 4 includes: the reflecting layer 40 that is provided on one surface of the support 30; the ultraviolet-sensing layer 20 that is provided on a surface of the reflecting layer 40 opposite to the support 30; and the filter layer 10 that is provided on a surface of the ultraviolet-sensing layer 20 opposite to the reflecting layer 40. The reflecting layer 40 may be formed directly on the surface of the support 30 or with a adhesion layer or the like interposed therebetween.

Figure 5:
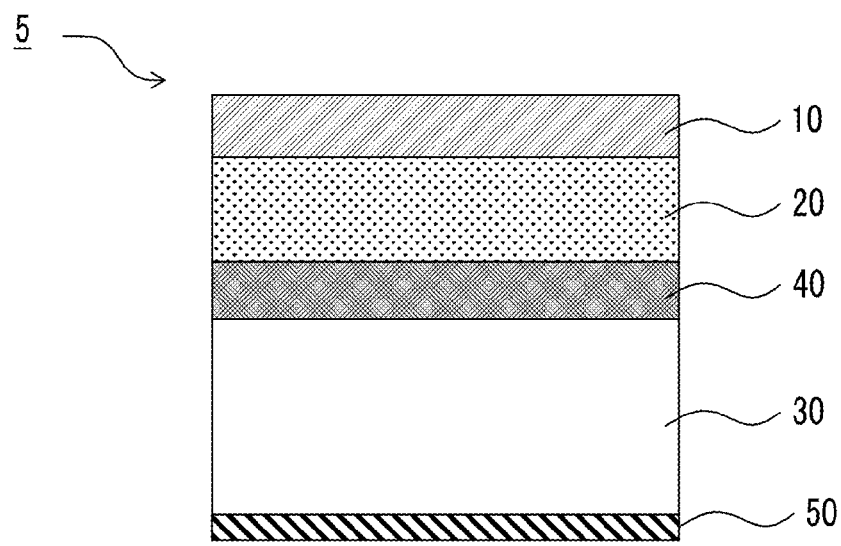
FIG. 5 is a schematic cross-sectional view showing still another example of the ultraviolet-sensing sheet according to the present invention.

An ultraviolet-sensing sheet 5 shown in FIG. 5 includes: the reflecting layer 40 that is provided on one surface of the support 30; the ultraviolet-sensing layer 20 that is provided on a surface of the reflecting layer 40 opposite to the support 30; and the filter layer 10 that is provided on a surface of the ultraviolet-sensing layer 20 opposite to the reflecting layer 40. In addition, the ultraviolet-sensing sheet 5 further includes the glossy layer 50 that is provided on a surface of the support 30 opposite to the reflecting layer 40. The reflecting layer 40 may be formed directly on the surface of the support 30 or with a adhesion layer or the like interposed therebetween.

The thickness of the ultraviolet-sensing sheet according to the present invention may be, for example, 5 to 250 µm. For example, the lower limit is more preferably 25 µm or more. For example, the upper limit is more preferably 150 µm or less.

The ultraviolet-sensing sheet according to the present invention may be configured to be wound in a roll shape.

Hereinafter, each layer will be described in detail.

<<<Filter Layer>>>

The filter layer 10 selectively allows transmission of light having a specific wavelength. "Selectively allowing transmission of light having a specific wavelength" denotes that the transmission of light having a specific wavelength is allowed and the transmission of light other than the light having a specific wavelength is prevented. The transmittance of the light having a specific wavelength whose transmission is allowed is preferably 70% or higher, more preferably 80% or higher, and still more preferably 90% or higher. The transmittance of the light having a specific wavelength whose transmission is prevented is preferably 30% or lower, more preferably 20% or lower, and still more preferably 10% or lower.

It is preferable that the filter layer 10 has a region in which a transmittance in a thickness direction in a wavelength range of 300 nm or longer and shorter than 380 nm is 70% or longer. The transmittance in a specific region in a wavelength range of 300 nm or longer and shorter than 380 nm may be 70% or higher, or the transmittance in the entire region in a wavelength range of 300 nm or longer and shorter than 380 nm may be 70% or higher.

In the present invention, it is preferable that the filter layer 10 has a maximum value of the transmittance in a wavelength range of 300 nm or longer and shorter than 380 nm. The maximum value of the transmittance in a thickness direction in a wavelength range of 300 nm or longer and shorter than 380 nm is preferably 70% or higher, more preferably 80% or higher, and still more preferably 90% or higher. The maximum value of the transmittance in a thickness direction in the thickness direction in a wavelength range of 380 nm to 450 nm is preferably 30% or lower, more preferably 20% or lower, and still more preferably 10% or lower. Due to the above-described spectral characteristics, the filter layer 10 can prevent the transmission of visible light and the like and can allow only ultraviolet light. As a result, the ultraviolet-sensing layer can be colored with higher accuracy.

In this specification, the spectral characteristics of the filter layer 10 are values obtained by measuring the transmittance in a wavelength range of 300 to 450 nm using a spectrophotometer (ref. a glass substrate) of an ultraviolet-visible-near infrared spectrophotometer (U-4100, manufactured by Hitachi High-Technologies Corporation).

The thickness of the filter layer 10 is preferably 0.1 to 10 µm. The lower limit is more preferably 0.5 µm or more, and still more preferably 1.0 µm or more. The upper limit is more preferably 8 µm or less, and still more preferably 6 µm or less. In a case where the thickness of the filter layer 10 is in the above-described range, a sufficient coloring sensitivity and sufficient gradation properties can be obtained at the same time.

In the present invention, it is preferable that the filter layer 10 includes at least either a yellow colorant or inorganic particles. By including a yellow colorant or inorganic particles, the above-described spectral characteristics are likely to be achieved. Regarding the yellow colorant and the inorganic particles, among various well-known compounds of the related art, one kind can be used alone or a mixture of two or more kinds can be used so as to achieve the above-described spectral characteristics.

(Yellow Colorant)

Examples of the yellow colorant include a pigment and a dye. As the pigment, various well-known pigments of the related art can be used. In addition, from the viewpoint that it is preferable that the pigment has a high transmittance, it is preferable that the particle size of the pigment is small as possible. From the viewpoint of handleability, the average particle size of the pigment is preferably 0.01 to 0.1 µm and more preferably 0.01 to 0.05 µm.

The average particle size refers to a volume average particle size which is a value measured using a laser diffraction scattering particle size distribution analyzer LA950 (manufactured by Horiba Ltd.).

Examples of the pigment are as follows:

C.I. Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214.

Examples of the dye are as follows:

acid yellow 1, 3, 7, 9, 11, 17, 23, 25, 29, 34, 36, 42, 54, 72, 73, 76, 79, 98, 99, 111, 112, 114, 116, 184, and 243; and Food Yellow 3.

Derivatives of the above-described dyes can be used.

(Inorganic Particles)

As the inorganic particles, particles of various well-known compounds of the related art can be used. For example, particles of silver (Ag), gold (Au), silicon (Si), silicon carbide (SiC), aluminum oxide, copper oxide, iron oxide, cobalt oxide, titanium oxide ($TiO_2$), titanium carbide (TiC), zinc oxide (ZnO), zirconium oxide ($ZrO_2$), cerium oxide ($CeO_2$), tin-doped indium oxide (ITO), antimony-doped tin oxide (ATO), or the like are preferable, and silver particles are more preferable. In addition, from the viewpoint of the transmittance of the filter layer, the average particle size of the inorganic particles is preferably 1 to 1000 nm, more preferably 10 to 100 nm, and still more preferably 20 to 60 nm.

In the present invention, the average particle size of the inorganic particles is a value measured using the same method as that of the yellow colorant.

In a case where the filter layer 10 includes the yellow colorant, the content of the yellow colorant is preferably 0.35 to 5.0 $g/m^2$. For example, the lower limit value is more preferably 0.4 $g/m^2$ or more and still more preferably 0.45 $g/m^2$ or more. For example, the upper limit value is more preferably 3.0 $g/m^2$ or less and still more preferably 2.0 $g/m^2$ or less. In a case where the content of the yellow colorant is in the above-described range, the spectral characteristics of the filter layer 10 are easily adjusted to be in the above-described range.

In a case where the filter layer 10 includes the inorganic particles, the content of the inorganic particles is preferably 0.01 to 1.0 $g/m^2$, more preferably 0.05 to 0.5 $g/m^2$, and still more preferably 0.08 to 0.15 $g/m^2$.

The filter layer 10 may further include chromatic colorants other than the yellow colorant (hereinafter, referred to as "the other colorants"). Examples of the other colorants include an inorganic pigment, an organic pigment, and a dye.

The filter layer 10 may include a resin. Examples of the resin include a binder and a dispersant.

Examples of the binder include various emulsions of polyvinyl alcohol, methyl cellulose, carboxymethyl cellulose, hydroxypropyl cellulose, gum Arabic, gelatin, polyvinyl pyrrolidone, casein, a styrene-butadiene latex, an acrylonitrile-butadiene latex, polyvinyl acetate, polyacrylate, an ethylene-vinyl acetate copolymer, and the like.

As the dispersant, well-known pigment dispersants and surfactants of the related art can be used. As the pigment dispersant and the surfactant, various kinds of compounds can be used, and examples thereof include: phthalocyanine derivatives (commercially available products: EFKA-745 manufactured by EFKA CHEMICALS B.V.) and SOL-SPERSE 5000 (manufactured by Zeneca Ltd.); cationic surfactants such as an organosiloxane polymer KP341 (manufactured by Shin-Etsu Chemical Co., Ltd.), a (meth) acrylic acid (co)polymer POLYFLOW No. 75, No. 90, or No. 95 (manufactured by Kyoeisha Chemical Co., Ltd.), and W001 (manufactured by Yusho Co., Ltd.); nonionic surfactants such as polyoxyethylene lauryl ether, polyoxyethylene stearyl ether, polyoxyethylene oleyl ether, polyoxyethylene octylphenyl ether, polyoxyethylene nonylphenyl ether, polyethylene glycol dilaurate, polyethylene glycol distearate, and sorbitan fatty acid esters; anionic surfactants such as W004, W005, and W017 (all of which are manufactured by Yusho Co., Ltd.); polymer dispersants such as EFKA-46, EFKA-47, EFKA-47EA, EFKA POLYMER 100, EFKA POLYMER 400, EFKA POLYMER 401, and EFKA POLYMER 450 (all of which are manufactured by Morishita Co., Ltd.) and DISPERSE AID 6, DISPERSE AID 8, DISPERSE AID 15, and DISPERSE AID 9100 (all of which are manufactured by San Nopco Ltd.); various SOLSPERSE dispersants (manufactured by Zeneca Ltd.) such as SOL-SPERSE 3000, 5000, 9000, 12000, 13240, 13940, 17000, 24000, 26000, and 28000; and ADEKA PLURONIC L31, F38, L42, L44, L61, L64, F68, L72, P95, F77, P84, F87, P94, L101, P103, F108, L121, and P-123" (all of which are manufactured by Adeka Corporation) and ISONET S-20 (manufactured by Sanyo Chemical Industries Ltd.).

The content of the resin in the filter layer 10 is preferably 0.1 to 10 $g/m^2$ in terms of solid content.

The filter layer 10 may include an antioxidant and a surfactant. The details of the surfactant and the like can be found in lower left column, page 9 to upper left column, page 10 in JP1989-207741A (JP-H01-207741A) and paragraphs "0038" and "0039" and "0048" to "0059" of JP2004-233614A, the contents of which are incorporated herein by reference.

The filter layer 10 can be prepared by applying a filter layer coating solution including a colorant to the ultraviolet-sensing layer or the like. The coating solution may be an aqueous solution in which water is used as a coating solvent, or may be a solvent solution in which an organic solvent such as toluene or methyl ethyl ketone is used as a coating solvent. In particular, from the viewpoint of environmental load, it is preferable that water is used as a solvent. Among these coating solvents, one kind may be used alone, or a mixture of two or more kinds may be used. Preferable examples of the coating solvent include water and water/methyl alcohol (=95/5 (mass ratio)).

Examples of a method of applying the filter layer coating solution include a dip coating method, an air knife coating method, a curtain coating method, a roller coating method, a doctor coating method, a wire bar coating method, a slide coating method, a gravure coating method, a spin coating method, and an extrusion coating method in which a hopper described in U.S. Pat. No. 2,681,294A is used.

<<<Ultraviolet-Sensing Layer>>>

The ultraviolet-sensing layer 20 includes a capsule including a color-forming dye and a photooxidant.

A mass ratio (color-forming dye:photooxidant) of the color-forming dye to the photooxidant in the capsule is preferably 1:0.1 to 1:10 and more preferably 1:0.5 to 1:5. In a case where the mass ratio of the color-forming dye to the photooxidant is in the above-described range, the ultraviolet-sensing layer 20 can be more efficiently colored with high sensitivity according to the dose of ultraviolet light irradiated.

The content of the capsule in the ultraviolet-sensing layer 20 is preferably 0.1 to 30 $g/m^2$ in terms of solid content. For example, the lower limit is more preferably 0.5 $g/m^2$ or more and still more preferably 1 $g/m^2$ or more. For example, the upper limit value is more preferably 25 $g/m^2$ or less and still more preferably 20 $g/m^2$ or less.

The ultraviolet-sensing layer 20 may include a resin. Examples of the resin include the binder and the like described above. The content of the binder is preferably 0.1 g/m² to 5 g/m² in terms of solid content.

In addition to the color-forming dye and the photooxidant included in the capsule, the ultraviolet-sensing layer 20 may include a sensitizer, a reducing agent, an antioxidant, a surfactant, and the like. The details of the sensitizer, the reducing agent, the surfactant, and the like can be found in lower left column, page 9 to upper left column, page 10 in JP1989-207741A (JP-H01-207741A) and paragraphs "0038" and "0039" and "0048" to "0059" of JP2004-233614A, the contents of which are incorporated herein by reference.

The thickness of the ultraviolet-sensing layer 20 is not particularly limited and is preferably 0.1 to 30 μm, more preferably 1 to 20 μm, and still more preferably 2 to 10 μm.

<<<<Capsule>>>>

The capsule included in the ultraviolet-sensing layer 20 includes a color-forming dye and a photooxidant.

In the capsule used in the present invention, it is preferable that: contact between materials present inside and outside of the capsule is prevented at normal temperature due to a material separating effect of a capsule wall; and only when the capsule is heated to a certain temperature or higher, the material permeability is increased. Regarding this phenomenon, the permeation start temperature can be freely controlled by appropriately selecting a capsule wall material, a capsule core material, and an additive. The permeation start temperature corresponds to the glass transition temperature of the capsule wall. The details can be found in JP1984-190886A (JP-S59-190886A), JP1985-242094A (JP-S60-242094A), and the like, the contents of which are incorporated herein by reference.

Examples of a method of controlling the glass transition temperature of the capsule wall include a method of changing the kind of the capsule wall material. Examples of the capsule wall material include polyurethane, polyurea, polyester, polycarbonate, a urea-formaldehyde resin, a melamine-formaldehyde resin, polystyrene, a styrene-methacrylate copolymer, gelatin, polyvinyl pyrrolidone, and polyvinyl alcohol. Among these, polyurethane, polyurea, polyamide, polyester, or polycarbonate is preferable, and polyurethane or polyurea is more preferable. Among these materials, one kind can be used alone, or two or more kinds can be used in combination.

It is preferable that the capsule used in the present invention is obtained by emulsifying core materials including reactive materials such as a color-forming dye and a photooxidant, and then forming a wall formed of a polymer material around oil droplets of the emulsion to form a capsule. In this case, a reactant which forms the polymer material is added to the inside and/or the outside of the oil droplets. The details of the capsule which can be preferably used in the present invention, for example, a preferable method of manufacturing the capsule can be found in the descriptions of U.S. Pat. No. 3,726,804A and U.S. Pat. No. 3,796,696A, the contents of which are incorporated herein by reference.

In addition, for example, in a case where polyurethane urea is used as the capsule wall material, a polyisocyanate and a second material (for example, polyol), which reacts with the polyisocyanate to form the capsule wall, are added to an aqueous phase or an oily liquid for forming a capsule, the components are mixed with each other, the mixture is emulsified and dispersed in water, and the temperature is increased. As a result, a polymer forming reaction is caused to occur in an oil droplet interface, and the capsule wall can be formed. For example, in a case where a polyamine is added as the second material or the second material is not added, polyurea is formed.

Examples of the polyisocyanate include: diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-4,4'-biphenyl-diisocyanate, 3,3'-dimethyldiphenylmethane-4,4'-diisocyanate, xylylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate, or cyclohexylene-1,4-diisocyanate; triisocyanates such as 4,4',4'-triphenylmethane triisocyanate or toluene-2,4,6-triisocyanate; tetra isocyanates such as 4,4'-dimethyldiphenylmethane-2,2',5,5'-tetraisocyanate; and isocyanate prepolymers such as an adduct of hexamethylene diisocyanate and trimethylolpropane, an adduct of 2,4-tolylene diisocyanate and trimethylolpropane, an adduct of xylylene diisocyanate and trimethylolpropane, and an adduct of tolylene diisocyanate and hexane triol. Examples of a commercially available product of the polyvalent isocyanate include TAKENATE series (manufactured by Mitsui Chemicals, Inc.) such as TAKENATE D-110N.

Examples of the polyol include aliphatic or aromatic polyhydric alcohols, hydroxy polyester, and hydroxy polyalkylene ether.

Specifically, polyols described in JP1985-49991A (JP-S60-49991A) can be used, and examples thereof include ethylene glycol, 1,3-propanediol, 1,4-butanediol, 1,5-pentanediol, 1,6-hexanediol, 1,7-heptanediol, 1,8-octanediol, propylene glycol, 2,3-dihydroxybutane, 1,2-dihydroxybutane, 1,3-dihydroxybutane, 2,2-dimethyl-1,3-propanediol, 2,4-pentanediol, 2,5-hexanediol, 3-methyl-1,5-pentanediol, 1,4-cyclohexanedimethanol, dihydroxycyclohexane, diethylene glycol, 1,2,6-trihydroxyhexane, 2-phenylpropyleneglycol, 1,1,1-trimethylolpropane, hexanetriol, pentaerythritol, a pentaerythritol-ethylene oxide adduct, a glycerin-ethylene oxide adduct, glycerin, 1,4-di(2-hydroxyethoxy)benzene, a condensate of an alkylene oxide and an aromatic polyhydric alcohol such as resorcinol dihydroxyethyl ether, p-xylylene glycol, m-xylylene glycol, α,α'-dihydroxy-p-diisopropylbenzene, 4,4'-dihydroxy-diphenylmethane, 2-(p,p'-dihydroxydiphenylmethyl)benzyl alcohol, an adduct of bisphenol A and ethylene oxide, and an adduct of bisphenol A and propylene oxide. It is preferable that the proportion of a hydroxyl group used in the polyol is 0.02 to 2 mol with respect to 1 mol of an isocyanate group.

Examples of the polyamine include ethylenediamine, trimethylenediamine, tetramethylenediamine, pentamethylenediamine, hexamethylenediamine, p-phenylenediamine, m-phenylenediamine, piperazine, 2-methylpiperazine, 2,5-dimethylpiperazine, 2-hydroxytrimethylenediamine, diethylenetriamine, triethylenetriamine, triethylenetetramine, diethylaminopropylamine, tetraethylenepentamine, and an amine adduct of an epoxy compound. The polyisocyanate can react with water to form a polymer material.

The details of the polyisocyanate, the polyol, and the polyamine (the second material) can be found in U.S. Pat. No. 3,281,383A, U.S. Pat. No. 3,773,695A, U.S. Pat. No. 3,793,268A, JP1973-40347B (JP-S48-40347B), JP1974-24159B (JP-S49-24159B), JP1973-80191A (JP-S48-80191A), and JP1973-84086B (JP-S48-84086B), the contents of which are incorporated herein by reference.

In general, the organic solvent for forming the oil droplets can be appropriately selected from high boiling point oils, and examples thereof include phosphates such as tricresyl phosphate, phthalates such as dibutylphthalate, acrylates, methacrylates, other carboxylates, fatty acid amides such as N,N-diethyldodecaneamide, alkylated biphenyls, alkylated terphenyls, chlorinated paraffin, alkylated naphthalenes, and diarylethanes. Specifically, organic solvents described in JP1985-242094A (JP-S60-242094A) and JP1988-045084A (JP-S63-045084A) can be used, the content of which is incorporated herein by reference.

In the present invention, an auxiliary solvent may be further added to the above-described organic solvent as a dissolution aid having a low boiling point. Examples of the auxiliary solvent include ethyl acetate, isopropyl acetate, butyl acetate, and methylene chloride.

It is preferable that an aqueous phase to be mixed with an oil phase may include a water-soluble polymer as a protective colloid, the water-soluble polymer being selected from the group consisting of well-known anionic polymers, non-ionic polymers, and amphoteric polymers. Examples of the water-soluble polymer include polyvinyl alcohol, gelatin, and cellulose derivatives.

In addition, the aqueous phase may include a surfactant. As the surfactant, a surfactant which does not cause precipitation or aggregation by reacting with the protective colloid can be appropriately selected from an anionic surfactant and a nonionic surfactant. Preferable examples of the surfactant include sodium alkylbenzenesulfonates (for example, sodium laurylsulfate), dioctyl sodium sulfosuccinates, and polyalkylene glycols (for example, polyoxyethylene nonylphenyl ether).

It is preferable that the capsule used in the present invention is a microcapsule having an average particle size of several micrometers. Specifically, the average particle size of the capsule is preferably 0.1 to 100 μm. The lower limit value is more preferably 0.3 μm or more, and still more preferably 0.5 μm or more. The upper limit value is more preferably 10 μm or less, and still more preferably 5 μm or less. By controlling the average particle size to be 0.1 μm or more, the core material in the capsule can be protected more stably. By controlling the average particle size to be 100 μm or less, the resolution of a chromogen can be improved.

The average particle size refers to a volume average particle size which is a value measured using a laser diffraction scattering particle size distribution analyzer LA950 (manufactured by Horiba Ltd.).

<<<<Color-Forming Dye>>>>

As the color-forming dye used in the present invention, a dye which can form a color due to the action of the photooxidant can be used. In particular, a leuco dye is preferable.

As the leuco dye, a reduction leuco dye having one or two hydrogen atoms which forms a dye by adding electrons thereto or removing electrons therefrom is preferable. By selecting a leuco dye, which is substantially colorless or exhibits a light color before removing electrons, among leuco dyes, a color can be formed by photooxidation. Among these color-forming dyes, one kind may be used alone, or a mixture of two or more kinds may be used.

Examples of the leuco dye include leuco dyes described in U.S. Pat. No. 3,445,234A, for example, (a) aminotriarylmethanes, (b) aminoxanthines, (c) aminothioxanthines, (d) amino-9,10-dihydroacridines, (e) aminophenoxazines, (f) aminophenothiazines, (g) aminodihydrophenazines, (h) aminodiphenylmethanes, (i) leuco indamines, (j) aminohydrocinnamic acids (cyanoethanes, leuco methines), (k) hydrazines, (l) leuco indigoid dyes, (m) amino-2,3-dihydroanthraquinones, (n) tetrahalo-p,p'-biphenols, (o) 2-(p-hydroxyphenyl)-4,5-diphenylimidazoles, and (p) phenethylanilines. Among these leuco dyes, (a) to (i) forms a dye by losing one hydrogen atom, and (j) to (p) forms a dye by losing two hydrogen atoms.

Among these, aminoarylmethanes are preferable, and aminotriarylmethanes are more preferable. Generally preferable examples of the aminotriarylmethanes include aminotriarylmethanes or acid salts thereof wherein at least two of the aryl groups are phenyl groups having (a) an $R^1R^2N$-substituent in the position para to the bond to the methane carbon atom wherein $R^1$ and $R^2$ are each groups selected from hydrogen, an alkyl group having 1 to 10 carbon atoms, a 2-hydroxyethyl group, a 2-cyanoethyl group, or a benzyl group and (b) a group ortho to the methane carbon atom which is selected from a lower alkyl group (having 1 to 4 carbon atoms), a lower alkoxy group (having 1 to 4 carbon atoms), a fluorine atom, a chlorine atom, or a bromine atom;

and the third aryl group (the remaining one aryl group) may be the same as or different from the other two aryl groups, and in a case where the third aryl group is different from the other two aryl groups, the third aryl group is selected from (a) a phenyl group which may be substituted with a lower alkyl group, a lower alkoxy group, a chlorine atom, a diphenylamino group, a cyano group, a nitro group, a hydroxy group, a fluorine atom, a bromine atom, an alkylthio group, an arylthio group, a thioester group, an alkylsulfonic acid group, an arylsulfonic acid group, a sulfonic acid group, a sulfonamido group, an alkylamido group, an arylamido group; (b) a naphthyl group which may be substituted with an amine group, a di-lower alkylamino group, or an alkylamino group; (c) a pyridyl group which may be substituted with alkyl; (d) a quinolyl group; and (e) an indolinylidene group which may be substituted with an alkyl group.

Preferably, $R^1$ and $R^2$ are hydrogen or alkyl having 1 to 4 carbon atoms. Most preferably, all three aryl groups are the same.

Specific examples of the leuco dye include tris(4-dimethylaminophenyl)methane, tris(4-diethyl aminophenyl)methane, bis(4-diethylaminophenyl)-(4-diethylamino-2-methylphenyl)methane, bis(4-diethylamino-2-methylphenyl)-(4-diethylaminophenyl)methane, bis(1-ethyl-2-methylindol-3-yl)-phenylmethane, 2-N-(3-trifluoromethylphenyl)-N-ethylamino-6-diethylamino-9-(2-methoxycarbonylphenyl) xanthene, 2-(2-chlorophenyl)amino-6-dibutylamino-9-(2-methoxycarbonylphenyl)xanthene, 2-dibenzylamino-6-diethylamino-9-(2-methoxycarbonylphenyl)xanthene, benzo[a]-6-N,N-diethylamino-9,2-methoxycarbonylphenyl) xanthene, 2-(2-chlorophenyl)-amino-6-dibutylamino-9-(2-methylphenylcarboxyamidophenyl)xanthene, 3,6-dimethoxy-9-(2-methoxycarbonyl)-phenylxanthene, benzoyl leuco methylene blue, and 3,7-bis-diethylaminophenoxazine. Examples of a commercially available product of the leuco dye include LEUCO CRYSTAL VIOLET (LCV, Yamada Chemical Co., Ltd.).

<<<<Photooxidant>>>>

The photooxidant used in the present invention is activated by light to generate radicals and has an action of extracting hydrogen from the color-forming dye. By using the photooxidant, the color optical density can continuously change depending on the ultraviolet irradiation dose, and the ultraviolet dose can be determined by visual inspection.

In particular, it is preferable that the photooxidant includes an organic halogen compound and a radical generator. A mass ratio (organic halogen compound:radical generator) of the organic halogen compound to the radical generator is preferably 1:0.1 to 1:10 and more preferably 1:0.5 to 1:5. By using the organic halogen compound and the radical generator in combination at the above-described ratio, the coloring reaction of the color-forming dye can be performed efficiently, and the color gradation properties of the ultraviolet-sensing layer 20 is likely to be adjusted to be in a range which is suitable for detecting an ultraviolet dose.

<<<<<Radical Generator>>>>>

As the radical generator, any compound which generates radicals when irradiated with ultraviolet light can be preferably used. For example, the radical generator can extract hydrogen from the color-forming dye to promote the oxidation of the color-forming dye. As the radical generator, a hydrogen-extracting radical generator is preferable.

Examples of the radical generator include: azide polymers described in The Lecture Summary, p. 55 for the Spring Meeting of the Society of Photographic Science and Technology of Japan, 1968; azide compounds described in U.S. Pat. No. 3,282,693A such as 2-azidobenzoxazole, benzoylazide, or 2-azidobenzimidazole; compounds described in U.S. Pat. No. 3,615,568A such as 3'-ethyl-1-methoxy-2-pyridothiacyanine perchlorate or 1-methoxy-2-methylpyridinium, p-toluenesulfonate; lophine dimer compounds described in JP1987-39728B (JP-S62-39728B) such as a 2,4,5-triarylimidazole dimer; and compounds such as benzophenone, p-aminophenyl ketone, polynuclear quinone, or thioxanthenone.

One or more kinds selected from a lophine dimer and a benzophenone are preferable, and a lophine dimer is more preferable.

Examples of the lophine dimer include a hexaarylbiimidazole compound. Examples of the hexaarylbiimidazole compound include 2,2'-bis(2-chlorophenyl)-4,4',5,5'-tetraphenyl biimidazole, 2,2'-bis(2-chlorophenyl)-4,4',5,5'-tetrakis(4-ethoxycarbonylphenyl)biimidazole, 2,2'-bis(2-chlorophenyl)-4,4',5,5'-tetrakis(4-phenoxycarbonylphenyl) biimidazole, 2,2'-bis(2,4-cyanophenyl)-4,4',5,5'-tetrakis(4-ethoxycarbonylphenyl)biimidazole, 2,2'-bis(2,4-cyanophenyl)-4,4',5,5'-tetrakis(4-phenoxycarbonylphenyl) biimidazole, 2,2'-bis(2-methylphenyl)-4,4',5,5'-tetrakis(4-methoxycarbonylphenyl)biimidazole, 2,2'-bis(2-methylphenyl)-4,4',5,5'-tetrakis(4-ethoxycarbonylphenyl) biimidazole, 2,2'-bis(2-methylphenyl)-4,4',5,5'-tetrakis(4-phenoxycarbonylphenyl)biimidazole, 2,2'-bis(2-ethylphenyl)-4,4',5,5'-tetrakis(4-methoxycarbonylphenyl) biimidazole, 2,2'-bis(2-ethylphenyl)-4,4',5,5'-tetrakis(4-ethoxycarbonylphenyl)biimidazole, 2,2'-bis(2-ethylphenyl)-4,4',5,5'-tetrakis(4-phenoxycarbonylphenyl)biimidazole, 2,2'-bis(2-phenylphenyl)-4,4',5,5'-tetrakis(4-methoxycarbonylphenyl)biimidazole, 2,2'-bis(2-phenylphenyl)-4,4',5,5'-tetrakis(4-ethoxycarbonylphenyl)biimidazole, 2,2'-bis(2-phenylphenyl)-4,4',5,5'-tetrakis(4-phenoxycarbonylphenyl) biimidazole, 2,2'-bis(2-chlorophenyl)-4,4',5,5'-tetra-(4-methoxyphenyl)biimidazole, 2,2'-bis(2-chlorophenyl)-4,4',5,5'-tetra-(3-methoxyphenyl)biimidazole, 2,2'-bis(2-chlorophenyl)-4,4',5,5'-tetra-(3,4-dimethoxyphenyl) biimidazole, 2,2'-bis(2,4-dicyanophenyl)-4,4',5,5'-tetraphenyl biimidazole, 2,2'-bis(2,4,6-tricyanophenyl)-4,4',5,5'-tetraphenyl biimidazole, 2,2'-bis(2,4-dimethylphenyl)-4,4',5,5'-tetraphenyl biimidazole, 2,2'-bis(2,4,6-trimethylphenyl)-4,4',5,5'-tetraphenyl biimidazole, 2,2'-bis(2,4-diethylphenyl)-4,4',5,5'-tetraphenyl biimidazole, 2,2'-bis(2,4,6-triethylphenyl)-4,4',5,5'-tetraphenyl biimidazole, 2,2'-bis(2,4-diphenylphenyl)-4,4',5,5'-tetraphenyl biimidazole, 2,2'-bis(2,4,6-triphenylphenyl)-4,4',5,5'-tetraphenyl biimidazole, and 2,2'-bis(2-fluorophenyl)-4,4',5,5'-tetraphenyl biimidazole.

Among these, 2,2'-bis(2-chlorophenyl)-4,4',5,5'-tetraphenyl biimidazole (for example, B-CIM, manufactured by Hodogaya Chemical Co., Ltd.) is preferable.

As the lophine dimer, a compound represented by the following Formula (1) can also be used.

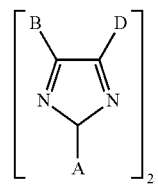

Formula (1)

(In Formula (1), A, B, and D each independently represent a carbocycle or a heteroaryl group which is unsubstituted or substituted with a substituent not interfering with the dissociation of the dimer into an imidazolyl group or the oxidation of the color-forming dye.)

A, B, and D each independently represent a carbocycle or a heteroaryl group which is unsubstituted or substituted with a substituent not interfering the dissociation of the dimer into an imidazolyl group or the oxidation of the color-forming dye.

It is preferable that B and D each independently have 0 to 3 substituents, and it is preferable that A has 0 to 4 substituents.

The details of the compound represented by Formula (1) and a method of manufacturing the same can be found in the knowledge of a lophine dimer and the like. For example, the details can be found in U.S. Pat. No. 3,552,973A, fourth column, line 22, to sixth column, line 3, the content of which is incorporated herein by reference.

<<<<<Organic Halogen Compound>>>>>

The organic halogen compound can promote the oxidation of the color-forming dye. Examples of the organic halogen compound include compounds represented by the following Formulae (2) to (7). It is preferable that the organic halogen compound is a compound in which the number of halogen atoms in one molecule is 3 or more. It is preferable that the upper limit of halogen atoms is, for example, 9 or less. In a case where the number of halogen atoms is 3 or more, an effect of improving gradation properties is obtained. Among these organic halogen compounds, one kind may be used alone, or a mixture of two or more kinds may be used. In the present invention, the organic halogen compound is a compound other than a lophine dimer and a benzophenone.

$$P^0\text{—}CX_3 \qquad (2)$$

In Formula (2), $P^0$ represents a hydrogen atom, a halogen atom, or an aryl group, and X represents a halogen atom.

Examples of the halogen atom represented by $P^0$ and X include a fluorine atom, a chlorine atom, a bromine atom, and an iodine atom. Among these, a chlorine atom or a bromine atom is preferable.

Examples of the compound represented by Formula (2) include trichloromethane, tribromomethane, carbon tetrachloride, carbon tetrabromide, p-nitrobenzotribromide, bromotrichloromethane, benzotrichloride, hexabromoethane, iodoform, 1,1,1-tribromo-2-methyl-2-propanol, 1,1,2,2-tetrabromoethane, 2,2,2-tribromoethanol, and 1,1,1-trichloro-2-methyl-2-propanol.

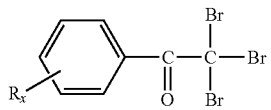

Formula (3)

In Formula (3), R represents a substituent. x represents an integer of 0 to 5.

R represents a substituent, and examples of the substituent include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms. In a case where plural R's are present, all the substituents may be the same as or different from each other.

x represents an integer of 0 to 5 and preferably 0 to 3.

Examples of the compound represented by Formula (3) include o-nitro-α,α,α-tribromoacetophenone, m-nitro-α,α,α-tribromoacetophenone, p-nitro-α,α,α-tribromoacetophenone, α,α,α-tribromoacetophenone, and α,α,α-tribromo-3,4-dichloroacetophenone.

$$R^1\text{—}SO_2\text{—}X^1 \qquad (4)$$

In Formula (4), $R^1$ represents an alkyl group which may have a substituent or an aryl group which may have a substituent, and $X^1$ represents a halogen atom.

$R^1$ represents an alkyl group which may have a substituent or an aryl group which may have a substituent. As the alkyl group which may have a substituent, an alkyl group having 1 to 20 carbon atoms is preferable, an alkyl group having 1 to 10 carbon atoms is more preferable, and an alkyl group having 1 to 6 carbon atoms is still more preferable.

As the aryl group which may have a substituent, an aryl group having 6 to 20 carbon atoms is preferable, an aryl group having 6 to 14 carbon atoms is more preferable, and an aryl group having 6 to 10 carbon atoms is still more preferable.

Examples of the substituent include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented $X^1$ include a fluorine atom, a chlorine atom, a bromine atom, and an iodine atom. Among these, a chlorine atom or a bromine atom is preferable.

Examples of the compound represented by Formula (4) include 2,4-dinitrobenzenesulfonyl chloride, o-nitrobenzenesulfonyl chloride, m-nitrobenzenesulfonyl chloride, 3,3'-diphenylsulfonedisulfonyl chloride, ethanesulfonyl chloride, p-bromobenzenesulfonyl chloride, p-nitrobenzenesulfonyl chloride, p-3-benzenesulfonyl chloride, p-acetamidobenzenesulfonyl chloride, p-chlorobenzenesulfonyl chloride, p-toluenesulfonyl chloride, methanesulfonyl chloride, and benzenesulfonyl bromide.

$$R^2\text{—}S\text{—}X^2 \qquad (5)$$

In Formula (5), $R^2$ represents an alkyl group which may have a substituent or an aryl group which may have a substituent, and $X^2$ represents a halogen atom.

$R^2$ represents an alkyl group which may have a substituent or an aryl group which may have a substituent. $R^2$ has the same definition and the same preferable range as $R^1$ in Formula (4).

Examples of the halogen atom represented $X^2$ include a fluorine atom, a chlorine atom, a bromine atom, and an iodine atom. Among these, a chlorine atom or a bromine atom is preferable.

Examples of the compound represented by Formula (5) include 2,4-dinitrobenzenesulfenyl chloride and o-nitrobenzenesulfenyl chloride.

$$R^3\text{-}L^1\text{-}CX^3X^4X^5 \qquad (6)$$

In Formula (6), $R^3$ represents an aryl group which may have a substituent or a heteroaryl group which may have a substituent, $L^1$ represents —SO— or —SO$_2$—, and $X^3$, $X^4$, and $X^5$ each independently represent a hydrogen atom or a halogen atom. In this case, not all of $X^3$, $X^4$, and $X^5$ represent a hydrogen atom.

$R^3$ represents an aryl group which may have a substituent or a heteroaryl group which may have a substituent, As the aryl group, an aryl group having 6 to 20 carbon atoms is preferable, an aryl group having 6 to 14 carbon atoms is more preferable, and an aryl group having 6 to 10 carbon atoms is still more preferable.

As the heteroaryl group, a heteroaryl group having 4 to 20 carbon atoms is preferable, a heteroaryl group having 4 to 13 carbon atoms is more preferable, and a heteroaryl group having 4 to 9 carbon atoms is still more preferable.

Examples of the substituent include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X^3$, $X^4$, and $X^5$ include a fluorine atom, a chlorine atom, a bromine atom, and an iodine atom. Among these, a chlorine atom or a bromine atom is preferable.

Examples of the compound represented by Formula (6) include hexabromodimethyl sulfoxide, pentabromodimethyl sulfoxide, hexabromodimethylsulfone, trichloromethylphenylsulfone, tribromomethylphenylsulfone, trichloro-p-chlorophenylsulfone, tribromomethyl-p-nitrophenylsulfone, 2-trichloromethylbenzothiazolesulfone, 4,6-dimethylpyrimidine-2-tribromomethylsulfone, tetrabromodimethylsulfone, 2,4-dichlorophenyl-trichloromethylsulfone, 2-methyl-4-chlorophenyltrichloromethylsulfone, 2,5-dimethyl-4-chlorophenyltrichloromethylsulfone, 2,4-dichlorophenyltrimethylsulfone, and tri-p-tolylsulfonium trifluoromethanesulfonate.

$$R^4CX^6X^7X^8 \qquad (7)$$

In Formula (7), $R^4$ represents a heteroaryl group which may have a substituent, and $X^6$, $X^7$, and $X^8$ each independently represent a hydrogen atom or a halogen atom. In this case, not all of $X^6$, $X^7$, and $X^8$ represent a hydrogen atom.

$R^4$ represents a heteroaryl group which may have a substituent. As the heteroaryl group, a heteroaryl group having 4 to 20 carbon atoms is preferable, a heteroaryl group having 4 to 13 carbon atoms is more preferable, and a heteroaryl group having 4 to 9 carbon atoms is still more preferable.

Examples of the substituent include a nitro group, a halogen atom, an alkyl group having 1 to 3 carbon atoms, a haloalkyl group having 1 to 3 carbon atoms, an acetyl group, a haloacetyl group, and an alkoxy group having 1 to 3 carbon atoms.

Examples of the halogen atom represented by $X^6$, $X^7$, and $X^8$ include a fluorine atom, a chlorine atom, a bromine atom, and an iodine atom. Among these, a chlorine atom or a bromine atom is preferable.

Examples of the compound represented by Formula (7) include tribromoquinaldine, 2-tribromomethyl-4-methylquinoline, 4-tribromomethylpyrimidine, 4-phenyl-6-tribromomethylpyrimidine, 2-trichloromethyl-6-nitrobenzothiazole, 1-phenyl-3-trichloromethylpyrazole, 2,5-ditribromomethyl-3,4-dibromothiophene, 2-trichloromethyl-3-(p-butoxystyryl)-1,3,4-oxadiazole, 2,6-ditrichloromethyl-4-(p-methoxyphenyl)-triazine, and 2-(4-methylphenyl)-4,6-bis(trichloromethyl)-1,3,5-triazine.

Among these, the compounds represented by Formulae (3), (6), and (7) are preferable, and as the halogen atom, bromine or iodine is preferable.

<<<<Reducing Agent>>>>

The ultraviolet-sensing layer 20 may include a reducing agent. The reducing agent may be present inside or outside of the capsule. The reducing agent has a function of deactivating the photooxidant. By the ultraviolet-sensing layer 20 containing the reducing agent, a rapid change in the color optical density of the ultraviolet-sensing layer 20 caused by ultraviolet irradiation can be prevented, and the color optical density can be continuously changed depending on the ultraviolet irradiation dose.

As the reducing agent, one kind can be used alone, or two or more kinds can be used in combination. Any reducing agent can be used without any particular limitation as long as it is a reducing material having a function of deactivating the photooxidant.

The reducing agent is not particularly limited as long as it acts as a so-called free-radical scavenger which traps free radicals of the activated photooxidant, and examples thereof include: organic reducing agents described in U.S. Pat. No. 3,042,513A (for example, hydroquinone, catechol, resorcinol, hydroxyhydroquinone, phloroglucinol, and aminophenols such as o-aminophenol and p-aminophenol); and cyclic phenylhydrazide compounds described in JP1987-39726B (JP-S62-39726B) (for example, 1-phenylpyrazolidin-3-one (Phenidone A, Formula (1) below), 1-phenyl-4-methylpyrazolidin-3-one (Phenidone B, Formula (2) below), 1-phenyl-4,4-dimethylpyrazolidin-3-one (Dimezone, Formula (3) below), 3-methyl-1-(p-sulfophenyl)-2-pyrazolin-5-one, and 3-methyl-1-phenyl-2-pyrazolin-5-one). Examples of a commercially available product of the reducing agent include 4-hydroxymethyl-4-methyl-1-phenyl-3-pyrazolidinone (Dimezone S, manufactured by Daito Chemical Co., Ltd.).

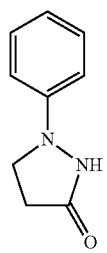

(1)

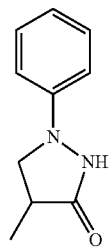

(2)

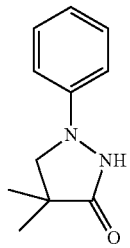

(3)

The cyclic phenylhydrazide may have a substituent at the phenyl group, and examples of the substituent include a methyl group, a trifluoromethyl group, a chlorine atom, a bromine atom, a fluorine atom, a methoxy group, an ethoxy group, a p-benzyloxy group, a butoxy group, a p-phenoxy group, a 2,4,6-trimethyl group, and a 3,4-dimethyl group.

The cyclic phenylhydrazide may have a substituent at 4 position of the heterocyclic group, and examples of the substituent include a bis-hydroxymethyl group, a hydroxymethyl group, a methyl group, an ethyl group, and a benzyl group.

The cyclic phenylhydrazide may have a substituent at 5 position of the heterocyclic group, and examples of the substituent include a methyl group and a phenyl group.

In addition, the reducing agent may be a guanidine derivative, an alkylenediamine derivative, or a hydroxyamine derivative.

Examples of the guanidine derivative include phenylguanidine, 1,3-diphenylguanidine, 1,2,3-triphenylguanidine, 1,2-dicyclohexylguanidine, 1,2,3-tricyclohexylguanidine, 1,3-di-o-tolylguanidine, o-tolyldiphenylguanidine, m-tolyldiphenylguanidine, p-tolyldiphenylguanidine, N,N'-dicyclohexyl-4-morpholinocarboxyamidine, 1,3-ditolyl-3-phenyl guanidine, 1,2-dicyclohexylphenylguanidine, 1-o-tolylbiguanide, and N-benzylidene-guanidinoamine.

Examples of the alkylenediamine derivative include ethylenediamine, propylenediamine, tetramethylenediamine, hexamethylenediamine, octamethylenediamine, 1,1,2-diaminododecane, and tetrabenzylethylenediamine.

Examples of the hydroxyamine derivative include diethanolamine, triethanolamine, and 3-β-naphthyloxy-1-N,N-dimethylamino-2-propanol.

In the ultraviolet-sensing sheet according to the present invention, the reducing agent may be dispersed in the form of a solid by a sand mill or the like, or may be dispersed in the form of an emulsion after being dissolved in oil.

In the case of the solid dispersion, the reducing agent is dispersed in a water-soluble polymer solution having a concentration of 2 to 30 mass %, in which a preferable particle size of dispersed particles is preferably 10 μm or less. Examples of a preferable water-soluble polymer include a water-soluble polymer used for forming the capsule. The details of a method and materials of the emulsion dispersion can be found those described in JP1988-045084A (JP-S63-045084A).

Regarding the preferable amount of the reducing agent, in a case where the reducing agent is present outside of the capsule, a molar ratio of the photooxidant to the reducing agent is preferably 1:0.1 to 1:100, more preferably 1:0.5 to 1:50, and still more preferably 1:1 to 1:10.

In a case where the reducing agent is included in the capsule, a molar ratio of the photooxidant to the reducing agent is preferably 1:0.001 to 1:0.1, more preferably 1:0.005 to 1:0.08, and still more preferably 1:0.01 to 1:0.05.

The ultraviolet-sensing layer 20 can be prepared by applying an ultraviolet-sensing layer coating solution including the capsule, which includes the color-forming dye and the photooxidant, to the support or the reflecting layer.

The amount of the ultraviolet-sensing layer coating solution applied is preferably 3 to 30 g/m$^2$ and more preferably 5 to 20 g/m$^2$ in terms of solid content.

A method of applying the ultraviolet-sensing layer coating solution and a coating solvent thereof are, for example, the same as described above regarding the filter layer.

<<<Support>>>

The support 30 is not particularly limited, and examples thereof include a resin film, paper, woven fabric, glass, wood, and metal. Among these, a resin film or paper is preferable. The support is not necessarily provided.

Examples of a material of the resin film include polyethylene resins, polypropylene resins, cyclic polyolefin resins, polystyrene resins, acrylonitrile-styrene copolymers, acrylonitrile-butadiene-styrene copolymers, polyvinyl chloride resins, fluororesins, poly(meth)acrylic resins, polycarbonate resins, polyester resins (for example, polyethylene terephthalate or polyethylene naphthalate), polyamide resins such as various nylons, polyimide resins, polyamide imide resins, polyarylphthalate resins, silicone resins, polysulfone resins, polyphenylene sulfide resins, polyethersulfone resins, polyurethane resins, acetal resins, and cellulose resins.

In addition, as the resin film, a white resin film in which a white pigment is dispersed in the resin can be preferably used.

The white resin film has ultraviolet reflectivity. Therefore, by using the white resin film as the support, ultraviolet light irradiated on the ultraviolet-sensing sheet can be reflected from the support. Thus, even without separately providing the reflecting layer, the scattering of ultraviolet light in the ultraviolet-sensing sheet can be prevented, and the detection accuracy of an ultraviolet dose can be further improved. The white resin film corresponds to "the layer having ultraviolet reflectivity".

As the white pigment, for example, an inorganic pigment such as titanium dioxide, barium sulfate, silicon oxide, aluminum oxide, magnesium oxide, calcium carbonate, kaolin, or talc can be appropriately selected and included. Among these, titanium dioxide is preferable. Examples of a commercially available product of the white pigment include TIPAQUE series, such as TIPAQUE R780-2 (manufactured by Ishihara Sangyo Kaisha, Ltd.).

The volume average particle size of the white pigment is preferably 0.1 to 10 μm and more preferably about 0.3 to 8 μm. In a case where the average particle size of the white pigment is in the above-described range, the reflection efficiency of light is high. The average particle size is a value measured using a laser diffraction scattering particle size distribution analyzer LA950 (manufactured by Horiba Ltd.).

As the white resin film, for example, a white polyester film is preferable, and a white polyethylene terephthalate film is more preferable.

Examples of a commercially available product of the white resin film include YUPO (manufactured by YUPO Corporation), LUMIRROR (manufactured by Toray Industries Inc.), and CRISPER (manufactured by Toyobo Co., Ltd.).

For example, the thickness of the support 30 is preferably 5 to 250 The lower limit is more preferably 25 μm or more, and still more preferably 50 μm or more. The upper limit is more preferably 150 μm or less, and still more preferably 100 μm or less.

<<<Reflecting Layer>>>

The ultraviolet-sensing sheet according to the present invention may have the reflecting layer 40. As shown in FIGS. 4 and 5, the reflecting layer 40 may be provided between the support 30 and the ultraviolet-sensing layer 20. In addition, as shown in FIGS. 2 and 3, the reflecting layer 40 may be provided on a surface of the support 30 opposite to the surface on which the ultraviolet-sensing layer 20 is provided. By providing the reflecting layer, the reflection density of ultraviolet light can be improved, and the ultraviolet light is not likely to be scattered in the ultraviolet-sensing sheet. In a case where the support 30 has ultraviolet reflectivity, the reflecting layer 40 is not necessarily provided. In a case where the support 30 is formed of a transparent material such as a transparent resin, it is preferable that the reflecting layer 40 is provided.

It is preferable that the reflecting layer 40 includes a resin and a white pigment. Optionally, the reflecting layer 40 is configured to further include other components such as various additives.

As the white pigment, for example, the white pigment described regarding the support 30 can be used, and a preferable range thereof is also the same.

The content of the white pigment is preferably 30 to 90 mass % and more preferably 50 to 85 mass % with respect to the total mass of the resin and the white pigment in the reflecting layer. In a case where the content of the white pigment is in the above-described range, the reflection efficiency of ultraviolet light and the like is high.

The content of the reflecting layer 40 in the white pigment is preferably 4 to 12 g/m$^2$ and more preferably 5 to 11 g/m$^2$. In a case where the content of the white pigment is 4 g/m$^2$ or more, a required reflectance is likely to be obtained. In a case where the content of the white pigment is 12 g/m$^2$ or less, the weight of the ultraviolet-sensing sheet is likely to be reduced.

In a case where the reflecting layer 40 includes two or more white pigments, it is preferable that the total content of the two or more white pigments is in the above-described range.

Examples of the resin used for the reflecting layer include polyvinyl alcohol, modified polyvinyl alcohols, hydroxyethyl cellulose, hydroxypropyl cellulose, epichlorohydrin-modified polyamides, ethylene-maleic anhydride copolymers, styrene-maleic anhydride copolymers, isobutylene-maleic anhydride-salicylic acid copolymers, polyacrylic acid, polyacrylic acid amide, methylol-modified polyacrylamides, starch derivatives, casein, gelatin, and styrene-butadiene rubber. In addition, in order to impart water resistance, a water resistance improver may be added, or a hydrophobic polymer emulsion, specifically, for example, an acrylic resin emulsion or a styrene-butadiene latex can also be added. From the viewpoint of improving transparency, as the resin, polyvinyl alcohol is preferable, and modified polyvinyl alcohols such as carboxy-modified polyvinyl alcohols or alkyl ether-modified polyvinyl alcohols can also be used.

The content of the resin is preferably 0.5 to 5 g/m$^2$ and more preferably 1 to 3 g/m$^2$. In a case where the content of the resin is 0.5 g/m$^2$ or more, the strength of the reflecting layer is sufficiently obtained. In addition, in a case where the content of the resin is 5 g/m$^2$ or less, the reflectance can be satisfactorily maintained.

In addition to the resin and the white pigment, the reflecting layer 40 optionally further includes other components. The other components are not particularly limited and can be appropriately selected according to the purpose or optionally. Examples of the other components include a crosslinking agent, a surfactant, and a filler.

The crosslinking agent can be appropriately selected among well-known crosslinking agents. Examples of the crosslinking agent include: water-soluble initial condensates such as N-methylolurea, N-methylolmelamine, and urea-formalin; dialdehyde compounds such as glyoxal and glutaraldehyde; inorganic crosslinking agents such as boric acid and borax; and polyamide-epichlorohydrin.

In a case where a water-soluble polymer compound (for example, gelatin or polyvinyl alcohol) is used as the resin, the storage stability can be further improved by adding the crosslinking agent to the resin to crosslink the resin.

In a case where the crosslinking agent is added, the addition amount of the crosslinking agent is preferably 5 to 50 mass % and more preferably 10 to 40 mass % with respect to the mass of the resin in the reflecting layer. In a case where the addition amount of the crosslinking agent is 5 mass % or higher, a sufficient crosslinking effect can be obtained while maintaining the strength and adhesion of the reflecting layer 40. In a case where the content of the crosslinking agent is 50 mass % or lower, a long pot life of the coating solution can be maintained.

Examples of the surfactant include well-known anionic or nonionic surfactants. In a case where the surfactant is added, the addition amount of the surfactant is preferably 0.1 to 15 mg/m$^2$ and more preferably 0.5 to 5 mg/$^2$. In a case where the addition amount of the surfactant is 0.1 g/m$^2$ or more, the reflecting layer is likely to be formed with high film forming properties. In a case where the addition amount of the surfactant is 15 g/m$^2$ or less, the adhesion between the support 30 and the reflecting layer 40 is excellent.

In addition to the white pigment, a filler such as silica may be further added to the reflecting layer 40. In a case where the filler is added, the addition amount of the filler is preferably 20 mass % or lower and more preferably 15 mass % or lower with respect to the mass of the resin in the reflecting layer 40. In a case where the addition amount of the filler is 20 mass % or lower, a required reflectance and the adhesion between the support and the reflecting layer can be obtained.

The thickness of the reflecting layer is preferably 5 to 30 μm. The lower limit is more preferably 7 μm or more and still more preferably 9 μm or more. The upper limit is more preferably 20 μm or less, and still more preferably 15 μm or less.

The reflecting layer is formed by applying a reflecting layer coating solution including the white pigment, the resin, and the like to at least one surface of the support. A method of applying the reflecting layer coating solution and a coating solvent thereof are, for example, the same as described above regarding the filter layer.

The reflecting layer 40 can be formed by directly applying the reflecting layer coating solution to the surface of the support 30 or by applying the reflecting layer coating solution with an adhesion layer interposed therebetween.

The amount of the reflecting layer coating solution applied is preferably 5 g/m$^2$ or more and more preferably 10 g/m$^2$ or more in terms of solid content. The upper limit is not particularly limited and is 30 g/m$^2$ or less.

It is preferable that the adhesion layer includes a resin, a crosslinking agent, and a surfactant.

Examples of the resin are the same as described above regarding the reflecting layer 40. In particular, a styrene butadiene rubber resin (SBR resin) is preferable.

As the crosslinking agent, the same crosslinking agents as described above regarding the reflecting layer 40 can be used, and glyoxal is preferable.

As the surfactant, the same surfactants as described above regarding the reflecting layer 40 can be used, and anionic surfactants are preferable. Among the anionic surfactants, sodium alkylbenzenesulfonates are preferable.

The adhesion layer is formed by applying an adhesion layer coating solution including the resin and the like to a surface of the support. A method of applying the adhesion layer coating solution and a coating solvent thereof are, for example, the same as described above regarding the filter layer.

<<Glossy Layer>>

The ultraviolet-sensing sheet according to the present invention may include the glossy layer 50. As shown in FIG. 3, the glossy layer 50 may be formed on a surface of the reflecting layer 40. In addition, as shown in FIG. 5, the glossy layer 50 may be formed on the support 30.

It is preferable that the glossy layer 50 includes a resin and a pigment. A proportion of the pigment in the glossy layer is preferably 30 to 90 mass % with respect to the total mass of the resin and the pigment in the glossy layer 50.

As the resin, for example, the resin described regarding the reflecting layer 40 can be used, and a preferable range thereof is also the same.

As the pigment, either an organic pigment or an inorganic pigment may be used. Examples of the organic pigment include monoazo pigments, condensed azo pigments, anthraquinone pigments, isoindolinone pigments, heterocyclic pigments, perinone pigments, quinacridone pigments, perylene pigments, thioindigo pigments, and dioxazine pigments. Examples of the inorganic pigment include carbon black, titanium oxide, titanium yellow, iron oxide, ultramarine, cobalt blue, baked pigments, and metallic pigments.

As the carbon black, for example, channel black, furnace black, lamp black, thermal black, Ketjen black, or naphthalene black can be preferably used. Among these carbon blacks, one kind may be used alone, or a combination of two or more kinds may be used. In addition, the carbon black may be used in combination with other colorants.

Examples of the metallic pigment include metal particles such as particles of aluminum, colored aluminum, nickel, tin, copper, gold, silver, platinum, iron oxide, stainless steel, or titanium; mica pearl pigments; colored graphite; colored glass fibers; colored glass flakes; and pearl pigments.

As the pigment, a commercially available product may be used. For example, Iriodin 111 (Merck Ltd.) can be used.

Optionally, the glossy layer is configured to further include other components such as various additives. As the various additives, the same additives as those described regarding the reflecting layer can be used, and a preferable range thereof is also the same.

The glossy layer is formed by applying a glossy layer coating solution including the resin, the pigment, and the like to a surface of the reflecting layer or the support 30. A method of applying the glossy layer coating solution and a coating solvent thereof are, for example, the same as described above regarding the filter layer.

The thickness of the glossy layer is preferably 0.5 to 20 μm, more preferably 0.7 to 15 inn, and still more preferably 1 to 5 μm.

<<Sensitivity-Adjusting Layer>>

In the ultraviolet-sensing sheet according to the present invention, a sensitivity-adjusting layer may be provided on a surface of the filter layer 10. By providing the sensitivity-adjusting layer, an ultraviolet irradiation dose contributing to coloring is adjusted, the ultraviolet-sensing layer can be continuously colored depending on a cumulative illuminance of ultraviolet light.

The sensitivity-adjusting layer is not particularly limited as long as it is a layer which affects an ultraviolet irradiation dose contributing to coloring, and examples thereof include a layer including a resin and pigment particles and a general substrate or film used for surface protection or lamination.

In the sensitivity-adjusting layer, it is preferable that a transmittance at 300 nm is 10% or lower and a transmittance at 450 nm is 70% or higher, it is preferable that a transmittance at 300 nm is 8% or lower and a transmittance at 450 nm is 80% or higher, and it is still preferable that a transmittance at 300 nm is 5% or lower and a transmittance at 450 nm is 90% or higher.

The thickness of the sensitivity-adjusting layer is preferably 0.5 to 20 μm, more preferably 1 to 15 μm, and still more preferably 2 to 10 μm.

<<<Layer Including Resin and Pigment Particles>>>

Examples of the sensitivity-adjusting layer include a layer including a resin and pigment particles. A proportion of the pigment particles in the sensitivity-adjusting layer is preferably 30 to 90 mass % with respect to the total mass of the resin and the pigment particles in the sensitivity-adjusting layer. Optionally, the sensitivity-adjusting layer is configured to further include other components such as various additives.

As the pigment particles, for example, the white pigment described regarding the support 30 can be used, and a preferable range thereof is also the same.

The content of the pigment particles per 1 $m^2$ of the sensitivity-adjusting layer is preferably 5 g or more, more preferably 8 g or more, and still more preferably 10 g or more. The upper limit is not particularly limited and is preferably 30 g or less. In a case where the content of the pigment particles is 5 g or more, a required reflectance is likely to be obtained. In a case where the content of the pigment particles is 30 g or less, the weight of the sheet according to the present invention is likely to be reduced.

The average particle size of the pigment particles is preferably 0.01 μm or more, more preferably 0.05 μm or more, and still more preferably 0.08 μm or more. The upper limit is not particularly limited and is preferably 10 μm or less and more preferably 8 μm or less. In a case where the average particle size of the pigment particles is in the above-described range, the reflection efficiency of light is high. The average particle size is a value measured using a laser diffraction scattering particle size distribution analyzer LA950 (manufactured by Horiba Ltd.).

Examples of the resin include polyesters, polyurethanes, acrylic resins, and polyolefins. From the viewpoint of durability, acrylic resins or polyolefins are preferable. In addition, as the acrylic resins, acrylic-silicone hybrid resin are also preferable. Regarding examples of the preferable resin, examples of the polyolefins include CHEMIPEARL S-120 and S-75N (both of which are manufactured by Mitsui Chemicals, Inc.). Examples of the acrylic resins include JURYMER ET-410 and SEK-301 (both of which are manufactured by Nihon Junyaku Co., Ltd.). Examples of the acrylic-silicone hybrid resins include CERANATE WSA1060 and WSA1070 (both of which are manufactured by DIC Corporation) and H7620, H7630, and H7650 (both of which are manufactured by Asahi Kasei Chemicals Corporation).

The content of the resin is preferably 0.5 to 5.0 $g/m^2$ and more preferably 1 to 3 $g/m^2$. In a case where the content of the resin is 0.5 $g/m^2$ or more, the strength of the sensitivity-adjusting layer is sufficiently obtained. In addition, in a case where the content of the resin is 5 $g/m^2$ or less, the reflectance and the mass can be satisfactorily maintained.

Optionally, additives such as an ultraviolet absorber, a crosslinking agent, a surfactant, and a filler may be further added to the sensitivity-adjusting layer. Examples of the crosslinking agent, the surfactant, and the filler are the same as described above.

<<<General Substrate or Film Used for Surface Protection or Lamination>>>

As the sensitivity-adjusting layer, for example, a general substrate or film used for surface protection or lamination can be used. In particular, an ultraviolet sensitivity adjusting film used in an ultraviolet-sensing set described below is preferable.

The substrate or film can be appropriately selected from well-known materials. Specific examples of the substrate or film include neutralized paper, acid paper, recycled paper, polyolefin resin-laminated paper, synthetic paper, polyester films, polyimide films, cellulose derivative films such as cellulose triacetate films, polystyrene films, polyolefin films such as polypropylene films or polyethylene films, poly-4-methylpentene-1, ionomers, polyvinyl chloride, polyvinylidene chloride, ABS resins, AS resins, methacrylic resins, polyvinyl alcohol, EVA, epoxy resins, unsaturated polyester resins, phenolic resins, urea-melamine resins, polyurethane resins, silicone resins, polyamide resins, polyacetals, polycarbonates, modified polyphenylene ethers, polyester resins, fluororesins, polyphenylene sulfides, polysulfones, polyarylates, polyether imides, polyether sulfones, polyether ketones, polyamide imides, polyarylethernitriles, polybenzimidazoles, and metal foils. Among these materials, the use of a film including one kind, a film including two or more kinds, or a composite sheet of these films can be considered.

In particular, in order to efficiently prevent deformation such as curling, the thermal shrinkages of the substrate or film in a vertical direction and a horizontal direction are preferably lower than 1% and more preferably 0.5% or lower.

In order to impart transparency, a film formed of a polymer is preferable. Examples of the film formed of a polymer include a synthetic polymer film, for example, a polyester film such as polyethylene terephthalate, polybutylene terephthalate, or polyethylene naphthalate, a cellulose triacetate film, or a polyolefin film such as polypropylene or polyethylene. Polyethylene naphthalate (PEN) or polyimide (PI) which has high temperature resistance is also preferably used.

The sensitivity-adjusting layer according to the present invention may include an ultraviolet absorber, or a layer including an ultraviolet absorber may be separately provided. In addition, the sensitivity-adjusting layer may include the ultraviolet absorber instead of the pigment particles, or include both the pigment particles and the ultraviolet absorber.

The ultraviolet absorber is not particularly limited and can be appropriately selected according to the purpose, and examples thereof include a benzophenone ultraviolet absorber, a benzotriazole ultraviolet absorber, a triazine ultraviolet absorber, a salicylate ultraviolet absorber, and a cyanoacrylate ultraviolet absorber. Among these ultraviolet absorbers, one kind may be used alone, or two or more kinds may be used in combination.

The benzophenone ultraviolet absorber is not particularly limited and can be appropriately selected according to the purpose, and examples thereof 2,4-hydroxy-4-methoxy-5-sulfobenzophenone.

The benzotriazole ultraviolet absorber is not particularly limited and can be appropriately selected according to the purpose, and examples thereof include 2-(5-chloro-2H-benzotriazol-2-yl)-4-methyl-6-tert-butylphenol (TINUVIN 326), 2-(2-hydroxy-5-methylphenyl)benzotriazole, 2-(2-hydroxy-5-tert-butylphenyl)benzotriazole, and 2-(2-hydroxy-3-5-di-tert-butylphenyl)-5-chlorobenzotriazole.

The triazine ultraviolet absorber is not particularly limited and can be appropriately selected according to the purpose, and examples thereof include a mono(hydroxyphenyl)triazine compound, a bis(hydroxyphenyl)triazine compound, and a tris(hydroxyphenyl)triazine compound.

Examples of the mono(hydroxyphenyl)triazine compound include 2-[4-[(2-hydroxy-3-dodecyloxypropyl)oxy]-2-hydroxyphenyl]-4,6-bis(2,4-dimethylphenyl)-1, 3,5-triazine, 2-[4-[(2-hydroxy-3-tridecyloxypropyl)oxy]-2-hydroxyphenyl]-4,6-bis(2,4-dimethylphenyl)-1, 3,5-triazine, 2-(2,4-dihydroxyphenyl)-4,6-bis(2,4-dimethylphenyl)-1,3,5-triazine, 2-(2-hydroxy-4-isooctyloxyphenyl)-4,6-bis(2,4-dimethylphenyl)-1,3,5-triazine, and 2-(2-hydroxy-4-dodecyloxyphenyl)-4,6-bis(2,4-dimethylphenyl)-1,3,5-triazine. Examples of the bis(hydroxyphenyl)triazine compound include 2,4-bis(2-hydroxy-4-propyloxyphenyl)-6-(2,4-dimethylphenyl)-1,3,5-triazine, 2,4-bis(2-hydroxy-3-methyl-4-propyloxyphenyl)-6-(4-methylphenyl)-1,3,5-triazine, 2,4-bis(2-hydroxy-3-methyl-4-hexyloxyphenyl)-6-(2,4-dimethylphenyl)-1,3,5-triazine, and 2-phenyl-4,6-bis[2-hydroxy-4-[3-(methoxyheptaethoxy)-2-hydroxypropyloxy]phenyl]-1,3,5-triazine. Examples of the tris(hydroxyphenyl) triazine compound include 2,4-bis(2-hydroxy-4-butoxyphenyl)-6-(2,4-dibutoxyphenyl)-1,3,5-triazine, 2,4,6-tris(2-hydroxy-4-octyloxyphenyl)-1,3,5-triazine, 2,4,6-tris[2-hydroxy-4-(3-butoxy-2-hydroxypropyl oxy)phenyl]-1,3,5-triazine, 2,4-bis[2-hydroxy-4-[1-(isooctyloxycarbonyl)ethoxy]phenyl]-6-(2,4-dihydroxyphenyl)-1,3,5-triazine, 2,4,6-tris[2-hydroxy-4-[1-(isooctyloxycarbonyl)ethoxy]phenyl]-1,3,5-triazine, and 2,4-bis[2-hydroxy-4-[1-(isooctyloxycarbonyl)ethoxy]phenyl]-6-[2,4-bis[1-(isooctyloxycarbonyl)ethoxy]phenyl]-1,3,5-triazine. Examples of a commercially available product of the triazine ultraviolet absorber include TINUVIN 477 (manufactured by BASF SE).

The salicylate ultraviolet absorber is not particularly limited and can be appropriately selected according to the purpose, and examples thereof include phenyl salicylate, p-tert-butylphenyl salicylate, p-octylphenyl salicylate, and 2-ethylhexyl salicylate.

The cyanoacrylate ultraviolet absorber is not particularly limited and can be appropriately selected according to the purpose, and examples thereof include 2-ethylhexyl-2-cyano-3,3-diphenylacrylate and ethyl-2-cyano-3,3-diphenylacrylate.

In the sensitivity-adjusting layer, a layer including an ultraviolet absorber may be provided as a separate layer. At this time, the sensitivity-adjusting layer optionally includes other components such as a resin. The resin is not particularly limited and can be appropriately selected according to the purpose, and examples thereof include an acrylic resin, polyvinyl butyral, and polyvinyl alcohol. It is preferable that a layer formed of a material not having an absorption in a range of 450 nm to 1500 nm is selected as the ultraviolet-absorbing layer and that the thickness of the ultraviolet-absorbing layer is thin.

The thickness of the layer including an ultraviolet absorber is preferably 0.01 μm to 1000 μm and more preferably 0.02 μm to 500 μm. In a case where the thickness of the layer including an ultraviolet absorber is less than 0.01 the absorption of ultraviolet light may be insufficient. In a case where the thickness of the layer including an ultraviolet absorber is more than 1000 μm, the transmittance of visible light may be reduced.

The content of the ultraviolet absorber varies depending on the ultraviolet absorber used and cannot be unconditionally determined. It is preferable that the content is appropriately selected such that a desired function of adjusting the sensitivity is imparted.

<Properties and Application of Ultraviolet-Sensing Sheet>

In the ultraviolet-sensing sheet according to the present invention, a slope γ of a straight line is preferably 0.06 to 0.7 which is plotted on a graph in which the horizontal axis represents a logarithm of a cumulative illuminance of light having a wavelength of 365 nm irradiated on the ultraviolet-sensing sheet and the vertical axis represents a color optical density of the ultraviolet-sensing layer. The slope γ is more preferably 0.1 to 0.6, still more preferably 0.1 or higher and lower than 0.4, and even still more preferably 0.4 to 0.6.

In a case where the slope γ is in the above-described range, color gradation properties which are suitable for detecting an ultraviolet dose can be obtained, and the ultraviolet dose can be easily verified by visual inspection.

For example, when a film is formed while curing an ultraviolet curable resin with ultraviolet light using a roll-to-roll method, the ultraviolet-sensing sheet according to the present invention can be used for measuring an ultraviolet dose, at which the ultraviolet light is irradiated using an ultraviolet irradiation device, even without using an ultraviolet dosimeter. In addition, for example, in order to determine the degree to which a human skin or a material is burned by ultraviolet light, the ultraviolet-sensing sheet can be used for regularly measuring an ultraviolet dose during daytime.

In this specification, "cumulative illuminance" refers to a cumulative illuminance measured at a wavelength of 365 nm, which is, for example, a value measured using a 365 nm UV illuminance meter. In addition, "color optical density" refers to a numerical value defined by "Reflection Density $D=-\log 10\rho$ (wherein ρ represents a reflectance), which is, for example, a visual numerical value measured using a reflection densitometer (X-Rite 310, manufactured by X-Rite Inc.).

<Ultraviolet-Sensing Set>

An ultraviolet-sensing set according to the present invention includes the above-described ultraviolet-sensing sheet according to the present invention and a sensitivity adjusting filter. The sensitivity adjusting filter is formed of, for example, the material described above regarding the sensitivity-adjusting layer. The sensitivity adjusting filter may be used after attached to the outmost surface of the ultraviolet-sensing sheet on the filter layer side.

<Ultraviolet-Sensing Method>

In a method of measuring an ultraviolet dose according to the present invention, the above-described ultraviolet-sensing sheet according to the present invention is used.

The ultraviolet-sensing sheet according to the present invention can be continuously colored depending on a cumulative illuminance of ultraviolet light, and the ultraviolet dose can be verified and detected by visual inspection. In addition, the ultraviolet-sensing sheet is in the form of a sheet and thus can measure an ultraviolet irradiation dose in a wide area.

The ultraviolet-sensing sheet according to the present invention is in the form of a sheet and thus can measure an ultraviolet dose by being mounted on a position where an ultraviolet dose is desired to be measured.

In the method of measuring an ultraviolet dose according to the present invention, light transmitted through the sensitivity adjusting filter may be caused to be incident on the ultraviolet-sensing sheet. According to this aspect, the measurement can be performed on a wide measurement range.

EXAMPLES

Hereinafter, the present invention will be described in detail using examples. Materials, used amounts, ratios, treatment details, treatment procedures, and the like shown in the following examples can be appropriately changed within a range not departing from the scope of the present invention. Accordingly, the scope of the present invention is not limited to the following specific examples. "Part(s)" indicating the addition amount represents "part(s) by mass".

Preparation of Ultraviolet-Sensing Sheet

Example 1

A mixed solution having the following composition was added to an aqueous solution including 63 parts of a 8 mass % aqueous polyvinyl alcohol solution and 100 parts of distilled water. The mixture was emulsified at 20° C. to obtain an emulsion having a volume average particle size of 1 μm. Further, the obtained emulsion was continuously stirred at 40° C. for 3 hours. Next, the emulsion was cooled to room temperature and was filtered to obtain an aqueous capsule dispersion.
—Composition of Mixed Solution—

| | |
|---|---|
| Color-forming dye: LEUCO CRYSTAL VIOLET(LCV, Yamada Chemical Co., Ltd., leuco dye) | 3 parts |
| Organic halogen compound: tribromomethylphenylsulfone (BMPS) | 1.5 parts |
| Radical generator: a lophine dimer (trade name: B-CIM/ manufacrured by Hodogaya Chemical Co., Ltd.) | 3 parts |
| Tricresyl phosphate: | 24 parts |
| TAKENATE D-110N (75 mass % ethyl acetate solution, manufactured by Mitsui Chemicals, Inc.) | 24 parts |

Next, a mixed solution having the following composition was dispersed using a DYNO-MILL (manufactured by Willy A. Bachofen AG) to obtain a Dimezone S dispersion having an average particle size of 3 μm.
—Composition of Mixed Solution—

| | |
|---|---|
| 4 mass % Aqueous polyvinyl alcohol solution | 150 parts |
| Reducing agent: 4-hydroxymethyl-4-methyl-1-phenyl-3-pyrazolidinone (Dimezone S, manufactured by Daito Chemical Co., Ltd.) | 30 parts |

9 parts of the prepared capsule dispersion and 9 parts of the Dimezone S dispersion were mixed with each other to prepare a ultraviolet-sensing layer coating solution. The obtained ultraviolet-sensing layer coating solution was applied to a white polyethylene terephthalate film having a thickness of 75 μm (support; trade name: CRISPER K1212, manufactured by Toyobo Co., Ltd., white PET) such that the amount thereof applied is 10 g/m² in terms of solid content, and was heated and dried at 50° C. for 1 minute. As a result, an ultraviolet-sensing layer was formed.

Next, a mixed solution having the following composition was dispersed using a DYNO-MILL (manufactured by Willy A. Bachofen AG) to obtain a filter layer coating solution.
—Composition of Mixed Solution—

| | |
|---|---|
| 4 mass % Aqueous polyvinyl alcohol solution | 100 parts |
| Colorant: C.I. Pigment Yellow 83 | 2 parts |

The prepared filter layer coating solution was applied to the ultraviolet-sensing layer such that the amount thereof applied is 3 g/m² in terms of solid content, and was dried at 50° C. for 1 minute. As a result, a filter layer (colorant content: 1.0 g/m²) was formed.

Example 2

An ultraviolet-sensing layer was formed using the same method as in Example 1, except that the organic halogen compound was changed to trichloromethane, and then an ultraviolet-sensing sheet was prepared.

Example 3

An ultraviolet-sensing layer was formed using the same method as in Example 1, except that the radical generator was changed to benzophenone, and then an ultraviolet-sensing sheet was prepared.

Example 4

An ultraviolet-sensing layer was formed using the same method as in Example 1, except that the color-forming dye was changed to tris[2-methyl-4-(diethylamino)phenyl]methane (TPM-T, manufactured by Hodogaya Chemical Co., Ltd., leuco dye), and then an ultraviolet-sensing sheet was prepared.

Example 5

A filter layer was formed using the same method as in Example 1, except that the colorant was changed to Acid Yellow 23, and then an ultraviolet-sensing sheet was prepared.

Examples 6 and 7

Filter layers were formed using the same method as in Example 1, except that the content of the colorant in the filter layer was changed to 0.5 g/m² and 1.5 g/m², respectively, and then ultraviolet-sensing sheets were prepared.

Example 8

A mixed solution having the following composition was dispersed using a DYNO-MILL (manufactured by Willy A. Bachofen AG) to obtain a reflecting layer coating solution.
A mixed solution having the following composition was dispersed using a DYNO-MILL (manufactured by Willy A. Bachofen AG) to obtain a titanium oxide dispersion having an average particle size of 1 μm.
—Composition of Mixed Solution—

| | |
|---|---|
| 4 mass % Aqueous polyvinyl alcohol solution | 80 parts |
| Titanium oxide (trade name: TIPAQUE R780-2, manufactured by Ishihara Sangyo Kaisha, Ltd.) | 50 parts |

10 parts of the obtained titanium oxide dispersion and 20 parts of the 6 mass % aqueous polyvinyl alcohol solution were mixed with each other to prepare a reflecting layer coating solution.

Next, the reflecting layer coating solution was applied to a polyethylene terephthalate film having a thickness of 75 μm (support; trade name: "LUMIRROR 510", manufactured by Toray Industries Inc., PET) such that the amount thereof applied was 10 g/m² in terms of solid content, and was heated and dried at 50° C. for 1 minute. As a result, a reflecting layer was formed.

Next, an ultraviolet-sensing sheet was prepared using the same method as in Example 1, except that the ultraviolet-sensing layer coating solution of Example 1 was applied to a surface of the polyethylene terephthalate film opposite to the surface on which the reflecting layer was formed.

Example 9

An ultraviolet-sensing sheet was prepared using the same method as in Example 1, except that the ultraviolet-sensing layer coating solution of Example 1 was not applied to the surface of the reflecting layer unlike Example 8.

Example 10

An ultraviolet-sensing sheet was prepared using the same method as in Example 1, except that paper (trade name "OK PRINCE HIGH-QUALITY PAPER, medium thick", manufactured by Oji Paper Co., Ltd.) was used as the support.

Example 11

An ultraviolet-sensing sheet was prepared using the same method as in Example 1, except that the radical generator was not used.

Example 12

An ultraviolet-sensing sheet was prepared using the same method as in Example 1, except that the organic halogen compound was not used.

Examples 13 and 14

Filter layers were formed using the same method as in Example 1, except that the colorant was changed to an ultraviolet absorber (trade name: "TINUVIN 213", manufactured by BASF SE) and a blue colorant (C.I. Pigment Blue 15), respectively, and then ultraviolet-sensing sheets were prepared.

Example 15

A filter layers was formed using the same method as in Example 1, except that the content of the colorant in the filter layer was changed to 0.3 g/m², and then an ultraviolet-sensing sheet was prepared.

Example 16

An ultraviolet-sensing sheet was prepared using the same method as in Example 1, except that the support was changed to a polyethylene terephthalate film having a thickness of 75 μm (support; trade name: "LUMIRROR S10", manufactured by Toray Industries Inc., PET).

Examples 17 to 20

Ultraviolet-sensing sheets were prepared using the same method as in Example 1, except that the mass ratio of the organic halogen compound to the radical generator was changed to values shown in the table, respectively.

Examples 21 to 24

Ultraviolet-sensing sheets were prepared using the same method as in Example 1, except that the mass ratio of the color-forming dye to the photooxidant was changed to values shown in the table, respectively.

Example 25

A filter layer was formed using the same method as in Example 1, except that the yellow colorant was changed to silver particles (average particle size: 40 nm) and the amount thereof applied was set to 0.3 g/m² in terms of solid content (the content of the silver particles: 0.1 g/m²), and then an ultraviolet-sensing sheet was prepared.

Example 26

A filter layer was formed using the same method as in Example 25, except that the average particle size of the silver particles was changed to 20 nm, and then an ultraviolet-sensing sheet was prepared.

Example 27

A filter layer was formed using the same method as in Example 25, except that the average particle size of the silver particles was changed to 60 nm, and then an ultraviolet-sensing sheet was prepared.

Comparative Example 1

An ultraviolet-sensing sheet was prepared using the same method as in Example 1, except that the filter layer was not formed.

Comparative Example 2

An ultraviolet-sensing sheet was prepared using the same method as in Example 1, except the radical generator and that the organic halogen compound were not used.

Comparative Example 3

A mixed solution having the following composition was dispersed using a DYNO-MILL (manufactured by Willy A. Bachofen AG) to prepare an ultraviolet-sensing layer coating solution.

—Composition of Mixed Solution—

| | |
|---|---|
| Color-forming dye: LEUCO CRYSTAL VIOLET(LCV, Yamada Chemical Co., Ltd., leuco dye) | 3 parts |
| Organic halogen compound: tribromomethylphenylsulfone (BMPS) | 1.5 parts |
| Radical generator: a lophine dimer (trade name: B-CIM/ manufactured by Hodogaya Chemical Co., Ltd.) | 3 parts |
| 4 mass % Aqueous polyvinyl alcohol solution | 150 parts |
| Reducing agent: 4-hydroxymethyl-4-methyl-1-phenyl-3-pyrazolidinone (Dimezone S, manufactured by Daito Chemical Co., Ltd.) | 30 parts |

The obtained ultraviolet-sensing layer coating solution was applied to a white polyethylene terephthalate film having a thickness of 75 μm (support; trade name: CRISPER K1212, manufactured by Toyobo Co., Ltd., white PET) such that the amount thereof applied was 10 g/m² in terms of solid content, and was heated and dried at 50° C. for 1 minute. As a result, an ultraviolet-sensing layer was formed. An ultraviolet-sensing sheet was prepared using the same method as in Example 1, except for ultraviolet-sensing layer was formed as described above.

[Measurement of Transmittance of Filter Layer]

The transmittance in a wavelength range of 300 to 450 nm was measured using a spectrophotometer (ref. the glass substrate) of an ultraviolet-visible-near infrared spectrophotometer (U-4100, manufactured by Hitachi High-Technologies Corporation). A maximum value (transmittance A) of a transmittance of the filter layer in a thickness direction in a wavelength range of 300 nm or longer and shorter than 380 nm and a maximum value (transmittance B) of a transmittance of the filter layer in the thickness direction in a wavelength range of 380 nm to 450 nm were evaluated based on the following criteria.

<Transmittance A>
A: 70% or higher
B: lower than 70% and 50% or higher
C: lower than 50%

<Transmittance B>
A: 30% or lower
B: higher than 30% and 50% or lower
C: higher than 50%

(Evaluation)

Regarding each of the ultraviolet-sensing sheets prepared in Examples and Comparative Examples, the color gradation properties and the coloring caused by fluorescent light were measured and evaluated as follows. The results are shown in the following tables.

In the following description, the color optical density of the ultraviolet-sensing sheet is a visual numerical value measured using a reflection densitometer (X-rite 310, manufactured by X-Rite Inc.) In addition, the cumulative illuminance of light at a wavelength of 365 nm is a value measured using a 365 nm UV illuminance meter.

[Color Gradation Properties]

Figure 6:
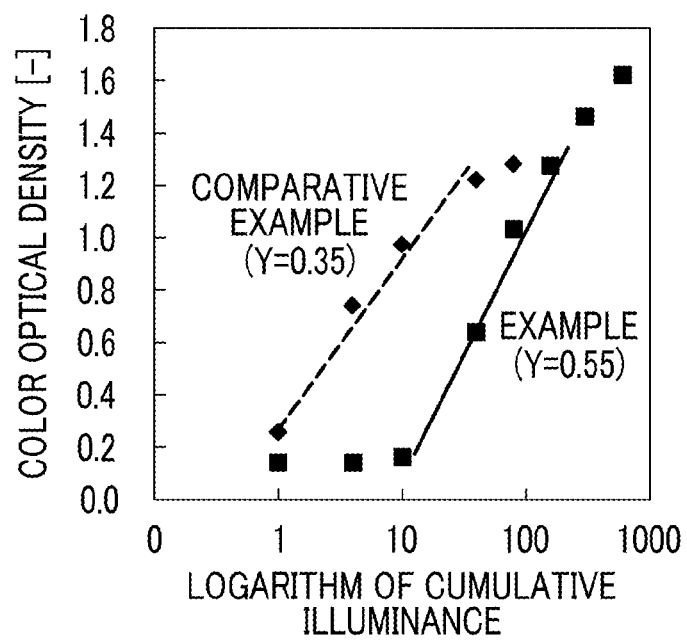
FIG. 6 is a graph showing color gradation properties of Example 1 and Comparative Example 1.

Using a high-pressure mercury lamp (high-pressure UV lamp, manufactured by Ushio Inc.), each of the ultraviolet-sensing sheets was irradiated with ultraviolet light. At this time, color changes were measured using a reflection densitometer (X-rite 310, manufactured by X-Rite Inc.) and were plotted on a graph in which the horizontal axis represents a logarithm of a cumulative illuminance of light having a wavelength of 365 nm and the vertical axis represents a color optical density of the ultraviolet-sensing layer. As a result, a slope γ of a straight line was obtained and was evaluated based on the following criteria. FIG. 6 is a graph showing color gradation properties of Example 1 and Comparative Example 1.

A: 0.4 to 0.6
B: 0.1 or higher and lower than 0.4
C: 0.06 or higher and lower than 0.1, or higher than 0.6 and 0.7 or lower
D: lower than 0.06, or higher than 0.7

[Coloring Caused by Fluorescent Light]

Each of the ultraviolet-sensing sheets was left to stand in a fluorescent light environment of 500 Lux, and the color optical densities of the ultraviolet-sensing sheet before and after the test were compared to each other. At this time, the time required to reach Δ=0.05 was measured and was evaluated based on the following criteria.

A: 3 hours or longer
B: 1 hour or longer and shorter than 3 hours
C: shorter than 1 hour

TABLE 1

| | | | Example 1 | Example 2 | Example 3 | Example 4 | Example 5 |
|---|---|---|---|---|---|---|---|
| Configuration | Filter Layer | Kind of Colorant | Pig.Y83 | Pig.Y83 | Pig.Y83 | Pig.Y83 | Acid Yellow23 |
| | | Content of Colorant | 1.0 g/m$^2$ | 1.0 g/m$^2$ | 1.0 g/m$^2$ | 1.0 g/m$^2$ | 1.0 g/m$^2$ |
| | | Transmittance A | A | A | A | A | A |
| | | Transmittance B | A | A | A | A | A |
| | Ultraviolet-Sensing Layer | Organic Halogen Compound | BMPS | Trichloromethane | BMPS | BMPS | BMPS |
| | | Radical Generator | B-CIM | B-CIM | Benzophenone | B-CIM | B-CIM |
| | | Color-Forming Dye | LCV | LCV | LCV | TPM-T | LCV |
| | | Ratio Organic Halogen Compound:Radical Generator | 1:2 | 1:2 | 1:2 | 1:2 | 1:2 |
| | | Ratio Color-Forming Dye:Photooxidant | 1:1.5 | 1:1.5 | 1:1.5 | 1:1.5 | 1:1.5 |
| | | Form | Capsule | Capsule | Capsule | Capsule | Capsule |
| | | Support | White PET | White PET | White PET | White PET | White PET |
| | | Layer Configuration | Filter Layer/Ultraviolet-Sensing Layer/Support | Filter Layer/Ultraviolet-Sensing Layer/Support | Filter Layer/Ultraviolet-Sensing Layer/Support | Filter Layer/Ultraviolet-Sensing Layer/Support | Filter Layer/Ultraviolet-Sensing Layer/Support |
| Performance | Color Gradation Properties | γ | 0.55 | 0.52 | 0.50 | 0.42 | 0.55 |
| | | Evaluation | A | A | A | A | A |
| | Coloring Caused by Fluorescent Light | Time (hr) | 23 | 26 | 28 | 30 | 24 |
| | | Evaluation | A | A | A | A | A |

TABLE 2

| | | | Example 6 | Example 7 | Example 8 | Example 9 |
|---|---|---|---|---|---|---|
| Configuration | Filter Layer | Kind of Colorant | Pig.Y83 | Pig.Y83 | Pig.Y83 | Pig.Y83 |
| | | Content of Colorant | 0.5 g/m$^2$ | 1.0 g/m$^2$ | 1.5 g/m$^2$ | 1.0 g/m$^2$ |
| | | Transmittance A | A | A | A | A |
| | | Transmittance B | A | A | A | A |

TABLE 2-continued

|  |  |  |  |  |  |  |
|---|---|---|---|---|---|---|
| | Ultraviolet-Sensing Layer | Organic Halogen Compound | BMPS | BMPS | BMPS | BMPS |
| | | Radical Generator | B-CIM | B-CIM | B-CIM | B-CIM |
| | | Color-Forming Dye | LCV | LCV | LCV | LCV |
| | | Ratio Organic Halogen Compound:Radical Generator | 1:2 | 1:2 | 1:2 | 1:2 |
| | | Ratio Color-Forming Dye:Photooxidant | 1:1.5 | 1:1.5 | 1:1.5 | 1:1.5 |
| | | Form | Capsule | Capsule | Capsule | Capsule |
| | | Support | White PET | White PET | PET | PET |
| | | Layer Configuration | Filter Layer/ Ultraviolet-Sensing Layer/Support | Filter Layer/ Ultraviolet-Sensing Layer/Support | Filter Layer/ Ultraviolet-Sensing Layer/Support/ Reflecting Layer | Filter Layer/ Ultraviolet-Sensing Layer/Reflecting Layer/Support |
| Performance | Color Gradation Properties | γ | 0.48 | 0.58 | 0.52 | 0.57 |
| | | Evaluation | A | A | A | A |
| | Coloring Caused by Fluorescent Light | Time (hr) | 25 | 21 | 23 | 23 |
| | | Evaluation | A | A | A | A |

|  |  |  |  | Example 10 | Example 11 | Example 12 |
|---|---|---|---|---|---|---|
| | Configuration | Filter Layer | Kind of Colorant | Pig.Y83 | Pig.Y83 | Pig.Y83 |
| | | | Content of Colorant | 1.0 g/m² | 1.0 g/m² | 1.0 g/m² |
| | | | Transmittance A | A | A | A |
| | | | Transmittance B | A | A | A |
| | | Ultraviolet-Sensing Layer | Organic Halogen Compound | BMPS | BMPS | — |
| | | | Radical Generator | B-CIM | — | B-CIM |
| | | | Color-Forming Dye | LCV | LCV | LCV |
| | | | Ratio Organic Halogen Compound:Radical Generator | 1:2 | 1:2 | 1:2 |
| | | | Ratio Color-Forming Dye:Photooxidant | 1:1.5 | 1:1.5 | 1:1.5 |
| | | | Form | Capsule | Capsule | Capsule |
| | | | Support | Paper | White PET | White PET |
| | | | Layer Configuration | Filter Layer/ Ultraviolet-Sensing Layer/Support | Filter Layer/ Ultraviolet-Sensing Layer/Support | Filter Layer/ Ultraviolet-Sensing Layer/Support |
| | Performance | Color Gradation Properties | γ | 0.56 | 0.18 | 0.11 |
| | | | Evaluation | A | B | B |
| | | Coloring Caused by Fluorescent Light | Time (hr) | 23 | 45 | 63 |
| | | | Evaluation | A | A | A |

TABLE 3

|  |  |  |  | Example 13 | Example 14 | Example 15 | Example 16 |
|---|---|---|---|---|---|---|---|
| Configuration | Filter Layer | | Kind of Colorant | TINUVIN213 | Pig.B15 | Pig.Y83 | Pig.Y83 |
| | | | Content of Colorant | 1.0 g/m² | 1.0 g/m² | 0.3 g/m² | 1.0 g/m² |
| | | | Transmittance A | B | B | A | A |
| | | | Transmittance B | B | B | B | A |
| | Ultraviolet-Sensing Layer | | Organic Halogen Compound | BMPS | BMPS | BMPS | BMPS |
| | | | Radical Generator | B-CIM | B-CIM | B-CIM | B-CIM |
| | | | Color-Forming Dye | LCV | LCV | LCV | LCV |
| | | | Ratio Organic Halogen Compound:Radical Generator | 1:2 | 1:2 | 1:2 | 1:2 |
| | | | Ratio Color-Forming Dye:Photooxidant | 1:1.5 | 1:1.5 | 1:1.5 | 1:1.5 |
| | | | Form | Capsule | Capsule | Capsule | Capsule |
| | | | Support | White PET | White PET | White PET | PET |
| | | | Layer Configuration | Filter Layer/ Ultraviolet-Sensing Layer/Support | Filter Layer/ Ultraviolet-Sensing Layer/Support | Filter Layer/ Ultraviolet-Sensing Layer/Support | Filter Layer/ Ultraviolet-Sensing Layer/Support |
| Performance | Color Gradation Properties | | γ | 0.39 | 0.20 | 0.40 | 0.31 |
| | | | Evaluation | B | B | A | B |
| | Coloring Caused by Fluorescent Light | | Time (hr) | 1.0 | 1.2 | 2.0 | 24.0 |
| | | | Evaluation | B | B | B | A |

TABLE 3-continued

|  |  |  |  | Example 17 | Example 18 | Example 19 |
|---|---|---|---|---|---|---|
| Configuration | Filter Layer | | Kind of Colorant | Pig.Y83 | Pig.Y83 | Pig.Y83 |
| | | | Content of Colorant | 1.0 g/m² | 1.0 g/m² | 1.0 g/m² |
| | | | Transmittance A | A | A | A |
| | | | Transmittance B | A | A | A |
| | Ultraviolet-Sensing Layer | | Organic Halogen Compound | BMPS | BMPS | BMPS |
| | | | Radical Generator | B-CIM | B-CIM | B-CIM |
| | | | Color-Forming Dye | LCV | LCV | LCV |
| | | | Ratio Organic Halogen Compound:Radical Generator | 1:0.05 | 1:0.5 | 1:9 |
| | | | Ratio Color-Forming Dye:Photooxidant | 1:1.5 | 1:1.5 | 1:1.5 |
| | | | Form | Capsule | Capsule | Capsule |
| | | | Support | White PET | White PET | White PET |
| | | | Layer Configuration | Filter Layer/ Ultraviolet-Sensing Layer/Support | Filter Layer/ Ultraviolet-Sensing Layer/Support | Filter Layer/ Ultraviolet-Sensing Layer/Support |
| Performance | Color Gradation Properties | | γ | 0.09 | 0.41 | 0.58 |
| | | | Evaluation | C | A | A |
| | Coloring Caused by Fluorescent Light | | Time (hr) | 32 | 28 | 17 |
| | | | Evaluation | A | A | A |

TABLE 4

|  |  |  |  | Example 20 | Example 21 | Example 22 | Example 23 | Example 24 |
|---|---|---|---|---|---|---|---|---|
| Configuration | Filter Layer | | Kind of Colorant | Pig.Y83 | Pig.Y83 | Pig.Y83 | Pig.Y83 | Pig.Y83 |
| | | | Content of Colorant | 1.0 g/m² | 1.0 g/m² | 1.0 g/m² | 1.0 g/m² | 1.0 g/m² |
| | | | Transmittance A | A | A | A | A | A |
| | | | Transmittance B | A | A | A | A | A |
| | Ultraviolet-Sensing Layer | | Organic Halogen Compound | BMPS | BMPS | BMPS | BMPS | BMPS |
| | | | Radical Generator | B-CIM | B-CIM | B-CIM | B-CIM | B-CIM |
| | | | Color-Forming Dye | LCV | LCV | LCV | LCV | LCV |
| | | | Ratio Organic Halogen Compound:Radical Generator | 1:11 | 1:2 | 1:2 | 1:2 | 1:2 |
| | | | Ratio Color-Forming Dye:Photooxidant | 1:1.5 | 1:0.05 | 1:0.5 | 1:9 | 1:11 |
| | | | Form | Capsule | Capsule | Capsule | Capsule | Capsule |
| | | | Support | White PET | White PET | White PET | White PET | White PET |
| | | | Layer Configuration | Filter Layer/ Ultraviolet-Sensing Layer/Support | Filter Layer/ Ultraviolet-Sensing Layer/Support | Filter Layer/ Ultraviolet-Sensing Layer/Support | Filter Layer/ Ultraviolet-Sensing Layer/Support | Filter Layer/ Ultraviolet-Sensing Layer/Support |
| Performance | Color Gradation Properties | | γ | 0.65 | 0.08 | 0.43 | 0.57 | 0.62 |
| | | | Evaluation | C | C | A | A | C |
| | Coloring Caused by Fluorescent Light | | Time (hr) | 12 | 41 | 27 | 19 | 14 |
| | | | Evaluation | A | A | A | A | A |

TABLE 5

|  |  |  | Example 25 | Example 26 | Example 27 |
|---|---|---|---|---|---|
| Configuration | Filter Layer | Kind of Inorganic Particles | Silver Particles (Average Particle Size: 40 nm) | Silver Particles (Average Particle Size: 20 nm) | Silver Particles (Average Particle Size: 60 nm) |
| | | Content of Inorganic Particles | 0.10 g/m² | 0.10 g/m² | 0.10 g/m² |
| | | Transmittance A | A | A | A |
| | | Transmittance B | A | A | A |
| | Ultraviolet-Sensing Layer | Organic Halogen Compound | BMPS | BMPS | BMPS |
| | | Radical Generator | B-CIM | B-CIM | B-CIM |
| | | Color-Forming Dye | LCV | LCV | LCV |
| | | Ratio Organic Halogen Compound: Radical Generator | 1:2 | 1:2 | 1:2 |
| | | Ratio Color-Forming Dye:Photooxidant | 1:1.5 | 1:1.5 | 1:1.5 |
| | | Form | Capsule | Capsule | Capsule |
| | | Support | White PET | White PET | White PET |
| | | Layer Configuration | Filter Layer/ Ultraviolet-Sensing Layer/Support | Filter Layer/ Ultraviolet-Sensing Layer/Support | Filter Layer/ Ultraviolet-Sensing Layer/Support |

TABLE 5-continued

|  |  |  | Example 25 | Example 26 | Example 27 |
|---|---|---|---|---|---|
| Performance | Color Gradation | γ | 0.55 | 0.58 | 0.53 |
|  | Properties | Evaluation | A | A | A |
|  | Coloring Caused by | Time (hr) | 32 | 28 | 35 |
|  | Fluorescent Light | Evaluation | A | A | A |

TABLE 6

|  |  |  | Comparative Example 1 | Comparative Example 2 | Comparative Example 3 |
|---|---|---|---|---|---|
| Configuration | Filter Layer | Kind of Colorant | — | Pig.Y83 | Pig.Y83 |
|  |  | Content of Colorant | — | 1.0 g/m² | 1.0 g/m² |
|  |  | Transmittance A | — | A | A |
|  |  | Transmittance B | — | A | A |
|  | Ultraviolet-Sensing Layer | Organic Halogen Compound | BMPS | — | BMPS |
|  |  | Radical Generator | B-CIM | — | B-CIM |
|  |  | Color-Forming Dye | LCV | LCV | LCV |
|  |  | Ratio Organic Halogen Compound:Radical Generator | 1:2 | 1:2 | 1:2 |
|  |  | Ratio Color-Forming Dye:Photooxidant | 1:1.5 | 1:1.5 | 1:1.5 |
|  |  | Form | Capsule | Capsule | Dispersion |
|  |  | Support | White PET | White PET | White PET |
|  |  | Layer Configuration | Ultraviolet-Sensing Layer/Support | Filter Layer/Ultraviolet-Sensing Layer/Support | Filter Layer/Ultraviolet-Sensing Layer/Support |
| Performance | Color Gradation | γ | 0.35 | 0.05 | 0.02 |
|  | Properties | Evaluation | B | D | D |
|  | Coloring Caused by | Time (hr) | 0.1 | 82 | 31 |
|  | Fluorescent Light | Evaluation | C | A | A |

As can be seen from the tables, in Examples, the color gradation properties were excellent, and coloring caused by fluorescent light was prevented.

On the other hand, in Comparative Examples, the excellent color gradation properties and the prevention of coloring caused by fluorescent light were not able to be achieved at the same time.

EXPLANATION OF REFERENCES 1 to 5: ultraviolet-sensing sheet
10: filter layer
20: ultraviolet-sensing layer
30: support
40: reflecting layer
50: glossy layer

What is claimed is:

1. An ultraviolet-sensing sheet comprising:
a filter layer that selectively allows transmission of light having a specific wavelength; and
an ultraviolet-sensing layer that includes a capsule including a color-forming dye and a photooxidant; and
wherein a maximum value of a transmittance of the filter layer in a thickness direction in a wavelength range of 300 nm or longer and shorter than 380 nm is 70% or higher, and
a maximum value of a transmittance of the filter layer in the thickness direction in a wavelength range of 380 nm to 450 nm is 20% or lower.

2. The ultraviolet-sensing sheet according to claim 1, wherein the filter layer includes at least either a yellow colorant or inorganic particles.

3. The ultraviolet-sensing sheet according to claim 2,
wherein, when the filter layer includes the yellow colorant, the content of the yellow colorant is 0.35 to 5.0 g/m²; and
wherein, when the filter layer includes the inorganic particles, the content of the inorganic particles is 0.01 to 1.0 g/m².

4. The ultraviolet-sensing sheet according to claim 1,
wherein the photooxidant includes an organic halogen compound and one or more radical generators selected from the group consisting of a lophine dimer and a benzophenone,
a mass ratio of the organic halogen compound to the radical generator is 1:0.1 to 1:10, and
the organic halogen compound is a compound other than a lophine dimer and a benzophenone.

5. The ultraviolet-sensing sheet according to claim 4,
wherein the number of halogen atoms in one molecule of the organic halogen compound is 3 or more.

6. The ultraviolet-sensing sheet according to claim 1,
wherein the color-forming dye is a leuco dye.

7. The ultraviolet-sensing sheet according to claim 1,
wherein a mass ratio of the color-forming dye to the photooxidant in the capsule is 1:0.1 to 1:10.

8. The ultraviolet-sensing sheet according to claim 1, further comprising:
a layer having ultraviolet reflectivity.

9. The ultraviolet-sensing sheet according to claim 1,
wherein a slope γ of a straight line is 0.06 to 0.7 which is plotted on a graph in which the horizontal axis represents a logarithm of a cumulative illuminance of light having a wavelength of 365 nm irradiated on the ultraviolet-sensing sheet and the vertical axis represents a color optical density of the ultraviolet-sensing layer.

10. An ultraviolet-sensing set comprising:
the ultraviolet-sensing sheet according to claim 1; and
a sensitivity adjusting filter.

11. A method of measuring an ultraviolet dose using the ultraviolet-sensing sheet according to claim 1.

12. The method of measuring an ultraviolet dose according to claim 11,
wherein light transmitted through the sensitivity adjusting filter is caused to be incident on the ultraviolet-sensing sheet.

13. The ultraviolet-sensing sheet according to claim 1, wherein the filter layer contains a resin.

\* \* \* \* \*